US010382382B2

(12) United States Patent
Chae et al.

(10) Patent No.: US 10,382,382 B2
(45) Date of Patent: Aug. 13, 2019

(54) METHODS AND SYSTEMS FOR MANAGING A USER PROFILE PICTURE ASSOCIATED WITH AN INDICATION OF USER STATUS ON A SOCIAL NETWORKING SYSTEM

(71) Applicant: FACEBOOK, INC., Menlo Park, CA (US)

(72) Inventors: Christiana Chae, San Francisco, CA (US); Jonathan Chan, New York, NY (US); Reece Stephen Davies, Mountain View, CA (US); James Altreuter, San Francisco, CA (US); Huiming Han, San Jose, CA (US); Harshdeep Singh, Santa Clara, CA (US); Volodymyr Giginiak, London (GB); Connor C. Hayes, San Francisco, CA (US); Sachin Monga, San Francisco, CA (US); Tatiana A. Vlahovic, San Francisco, CA (US); Mohan Jiang, Mountain View, CA (US); Xinjie Zhou, Menlo Park, CA (US); Jesse Marion Blake Halim, Sunnyvale, CA (US); Chieh Ho, Sunnyvale, CA (US); Matthew Randall Kula, San Francisco, CA (US); Meng Lu, Fremont, CA (US); Adrian Lai, San Francisco, CA (US)

(73) Assignee: FACEBOOK, INC., Menlo Park, CA (US)

( * ) Notice: Subject to any disclaimer, the term of this patent is extended or adjusted under 35 U.S.C. 154(b) by 283 days.

(21) Appl. No.: 15/285,322

(22) Filed: Oct. 4, 2016

(65) Prior Publication Data

US 2018/0095606 A1 Apr. 5, 2018

(51) Int. Cl.
*H04L 12/58* (2006.01)

(52) U.S. Cl.
CPC .................................. *H04L 51/32* (2013.01)

(58) Field of Classification Search
None
See application file for complete search history.

(56) References Cited

U.S. PATENT DOCUMENTS

| 2012/0124508 | A1* | 5/2012 | Morin ............... H04L 51/32 715/781 |
| 2012/0233260 | A1* | 9/2012 | Tiu, Jr. ............. G06F 17/3089 709/204 |

(Continued)

OTHER PUBLICATIONS

"How to Set a Temporary Facebook Profile Picture or Frame" by Jason Fitzpatrick, dated Sep. 30, 2016, hereinafter referred to as Fitzpatrick, and retrieved from https://www.howtogeek.com/273631/how-to-set-a-temporary-facebook-profile-picture-or-frame/ (Year: 2016).*

*Primary Examiner* — Stephen S Hong
*Assistant Examiner* — Sanchita Roy
(74) *Attorney, Agent, or Firm* — Morgan, Lewis & Bockius LLP

(57) ABSTRACT

A client device receives from a user, in an application associated with a social networking service provided by a server system, a first user input for creating a first post on a social networking system. In response to the first user input, a plurality of icons for selection by the user are displayed. A selection of a first icon from the plurality of icons is received from the user. The first post including a first image associated with the user is posted to the social networking system. The first image includes the first icon overlaying at least a portion of a profile picture of the user.

15 Claims, 16 Drawing Sheets

(56) References Cited

U.S. PATENT DOCUMENTS

| | | | |
|---|---|---|---|
| 2013/0073985 A1* | 3/2013 | Hamlin | G06F 3/0481 715/753 |
| 2014/0089816 A1* | 3/2014 | DiPersia | G06F 3/0484 715/753 |
| 2015/0052462 A1* | 2/2015 | Kulkarni | G06F 3/04817 715/765 |
| 2016/0110906 A1* | 4/2016 | Ahuja | G06T 11/60 345/634 |
| 2016/0179769 A1* | 6/2016 | Gershom | G06F 16/23 715/235 |

* cited by examiner

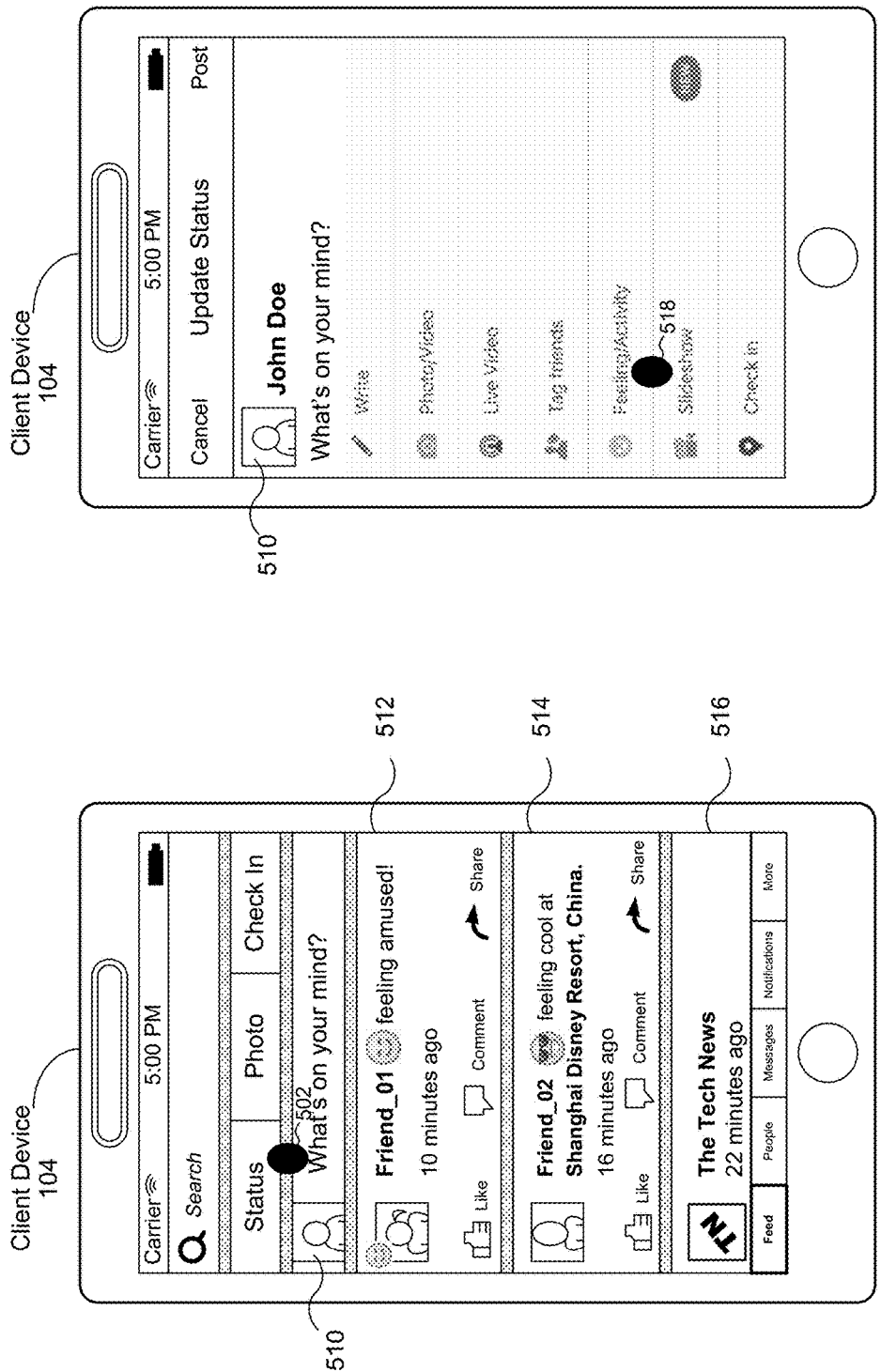

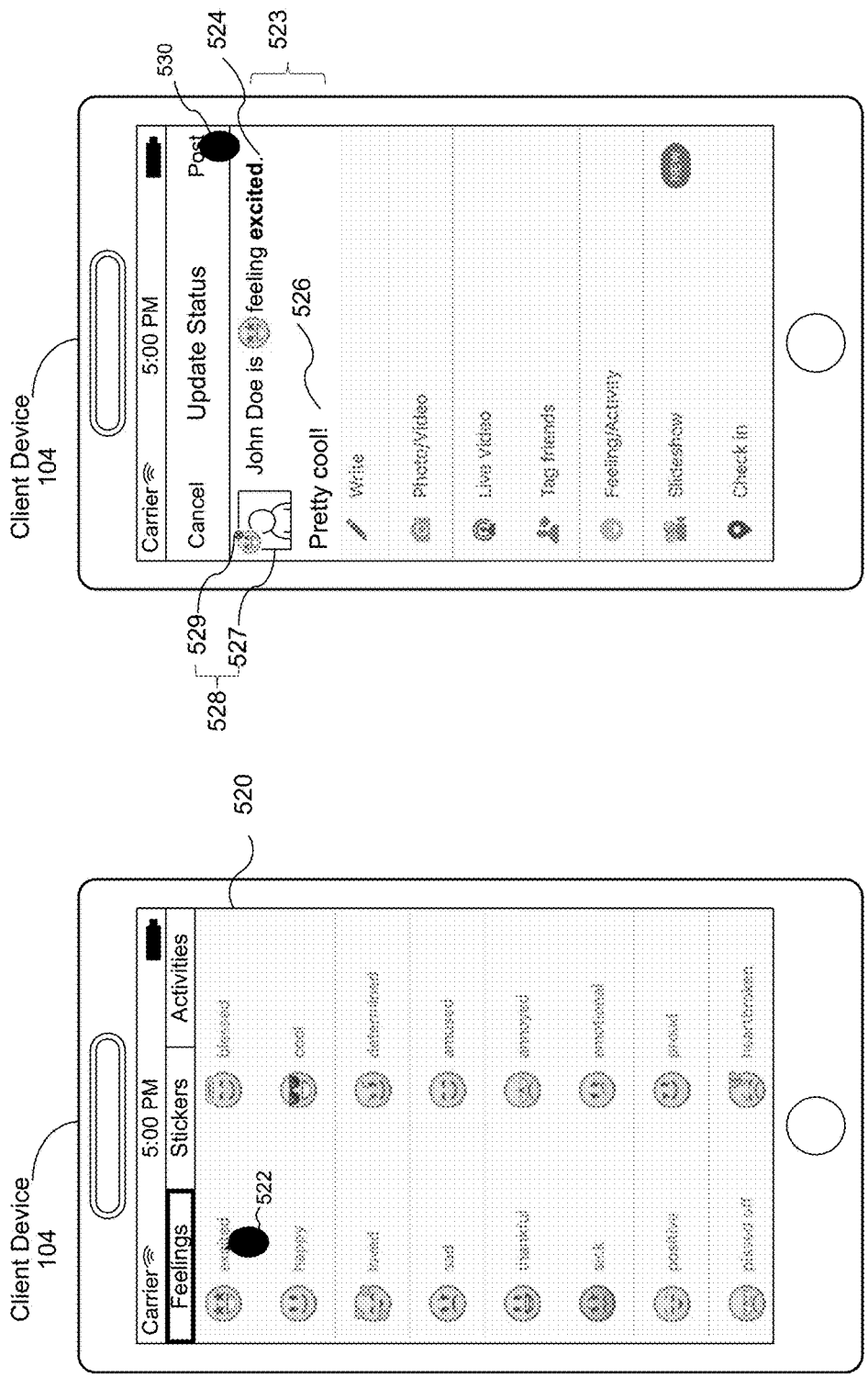

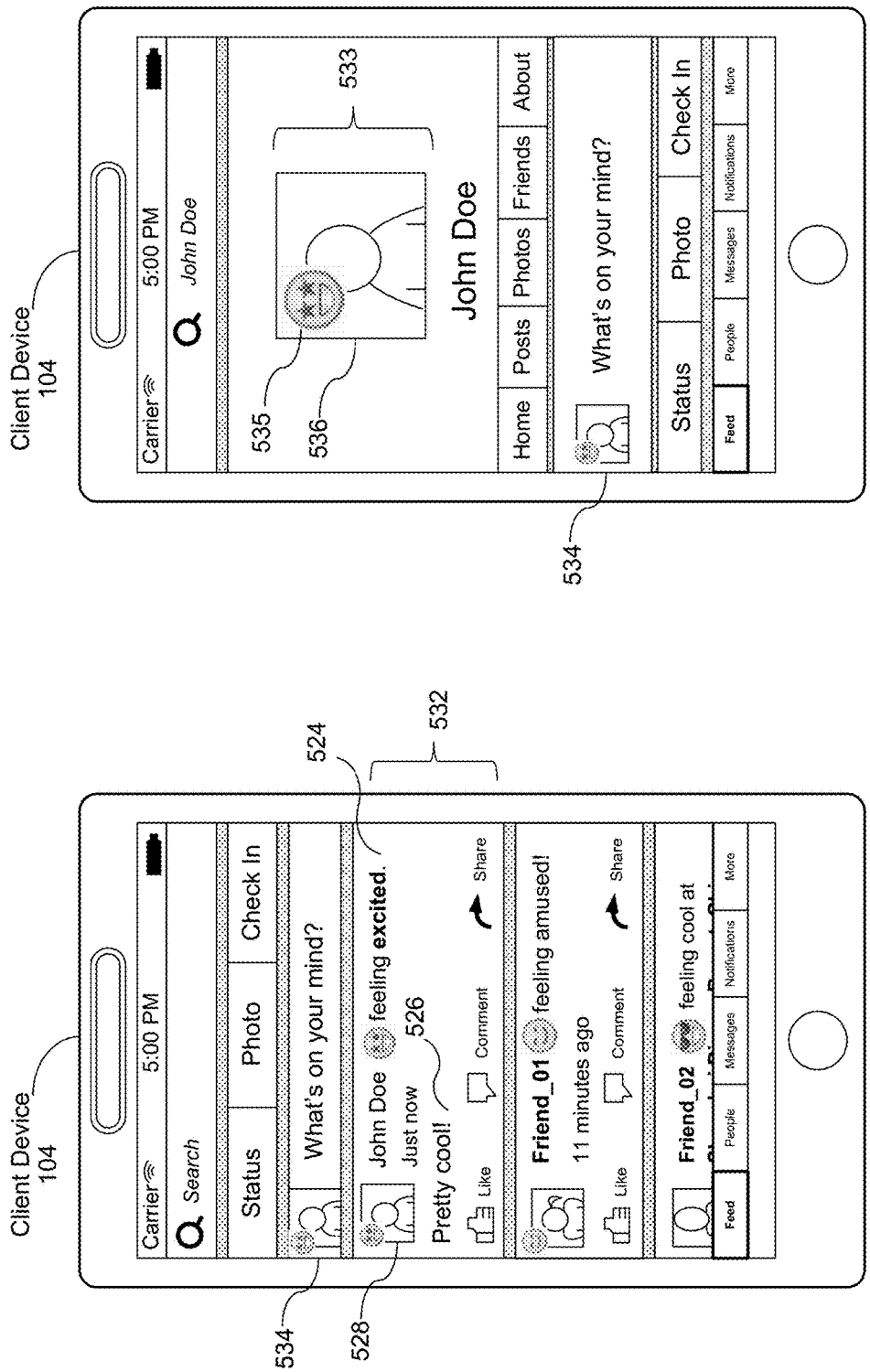

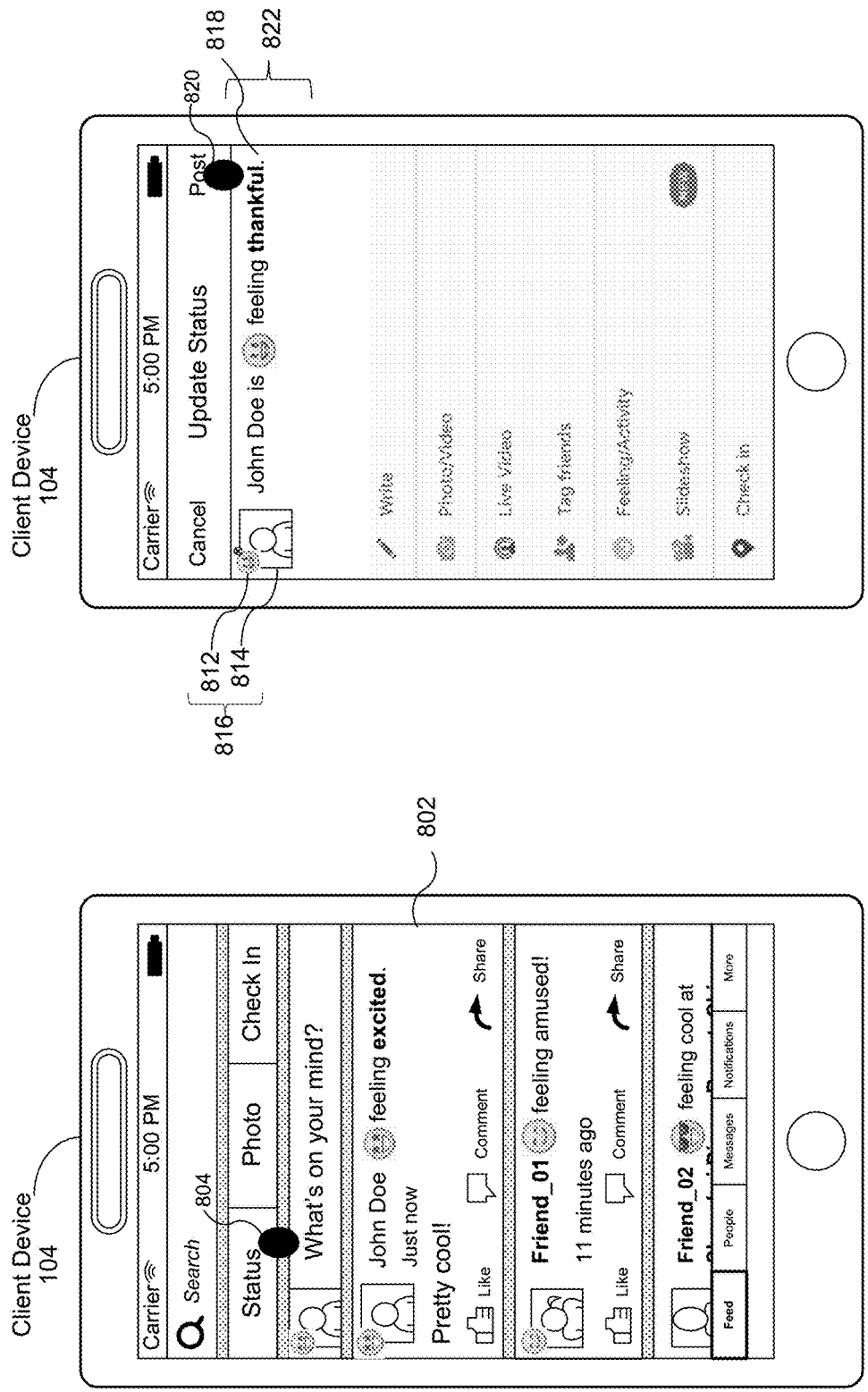

METHODS AND SYSTEMS FOR MANAGING A USER PROFILE PICTURE ASSOCIATED WITH AN INDICATION OF USER STATUS ON A SOCIAL NETWORKING SYSTEM

TECHNICAL FIELD

This relates generally to social networking systems, including but not limited to managing a user profile picture associated with an icon indicating a user's status on a social networking system.

BACKGROUND

Social networks and instant messaging programs on electronic devices provide a convenient means of communications between individuals, where text characters and symbols are combined to compose messages.

Forming strings of text, however, typically involves the manual input and selection of characters using a physical or virtual keyboard. As such, electronic messaging is often inefficient and time-consuming, and subject to both human and machine-based inaccuracies. Furthermore, it can be difficult to clearly express emotional status and/or feelings using text characters and symbols.

SUMMARY

Accordingly, there is a need for methods, systems, and interfaces for visualizing and conveying emotions, status, and/or feelings of a user by a social networking system. For example, by associating an icon (e.g., an emotion icon, a feeling icon, a status icon, a state icon, an emoticon, or an emoji) that visually represents a user's status with a user profile picture on the social networking system, the user's status can be clearly conveyed to other users on the social networking system. The user can change the icon to another icon representing the current status of the user whenever there is a change to the user's status. The user can also manage the display options of the icon on the user's profile picture. The icon can provide a shortcut for other users to view a post associated with the creation of the icon.

In accordance with some embodiments, a method is performed at a client device with one or more processors and memory storing instructions for execution by the one or more processors. The method includes receiving a first user input for creating a first post on a social networking system from a user. In response to the first user input, a plurality of icons for selection by the user are displayed. A selection of a first icon from the plurality of icons is received from the user. The first post including a first image associated with the user is posted to the social networking system. The first image includes the first icon overlaying at least a portion of a profile picture of the user.

In accordance with some embodiments, a client device includes one or more processors, memory, and one or more programs; the one or more programs are stored in the memory and configured to be executed by the one or more processors. The one or more programs include instructions for performing the operations of the method described above for the client device. In accordance with some embodiments, a non-transitory computer-readable storage medium has stored therein instructions that, when executed by the client device, cause the client device to perform the operations of the method described above.

In accordance with some embodiments, a method is performed at a server system of a social networking service. The server system has one or more processors and memory storing instructions for execution by the one or more processors. The method includes receiving a first request from a user device of a first user to create a first post. A plurality of icons are provided to the user device for display. A selection of a first icon from the plurality of icons is received from the user device. A first image is generated for display in the first post. The first image includes the first icon overlaying at least a portion of a profile picture of the first user.

In accordance with some embodiments, a server system includes one or more processors, memory, and one or more programs; the one or more programs are stored in the memory and configured to be executed by the one or more processors. The one or more programs include instructions for performing the operations of the server-side method described above. In accordance with some embodiments, a non-transitory computer-readable storage medium has stored therein instructions that, when executed by the server system, cause the server system to perform the operations of the server-side method described above.

BRIEF DESCRIPTION OF THE DRAWINGS

For a better understanding of the various described embodiments, reference should be made to the Description of Embodiments below, in conjunction with the following drawings. Like reference numerals refer to corresponding parts throughout the figures and description.

FIGS. 5A-5F illustrate exemplary graphical user interfaces (GUIs) on a client device for creating an icon overlaying at least a portion of a profile picture of a user on a social networking system, in accordance with some embodiments.

FIGS. 8A-8D illustrate exemplary GUIs on a client device for updating an image of a user on a social networking system, in accordance with some embodiments.

DESCRIPTION OF EMBODIMENTS

Figure 1:
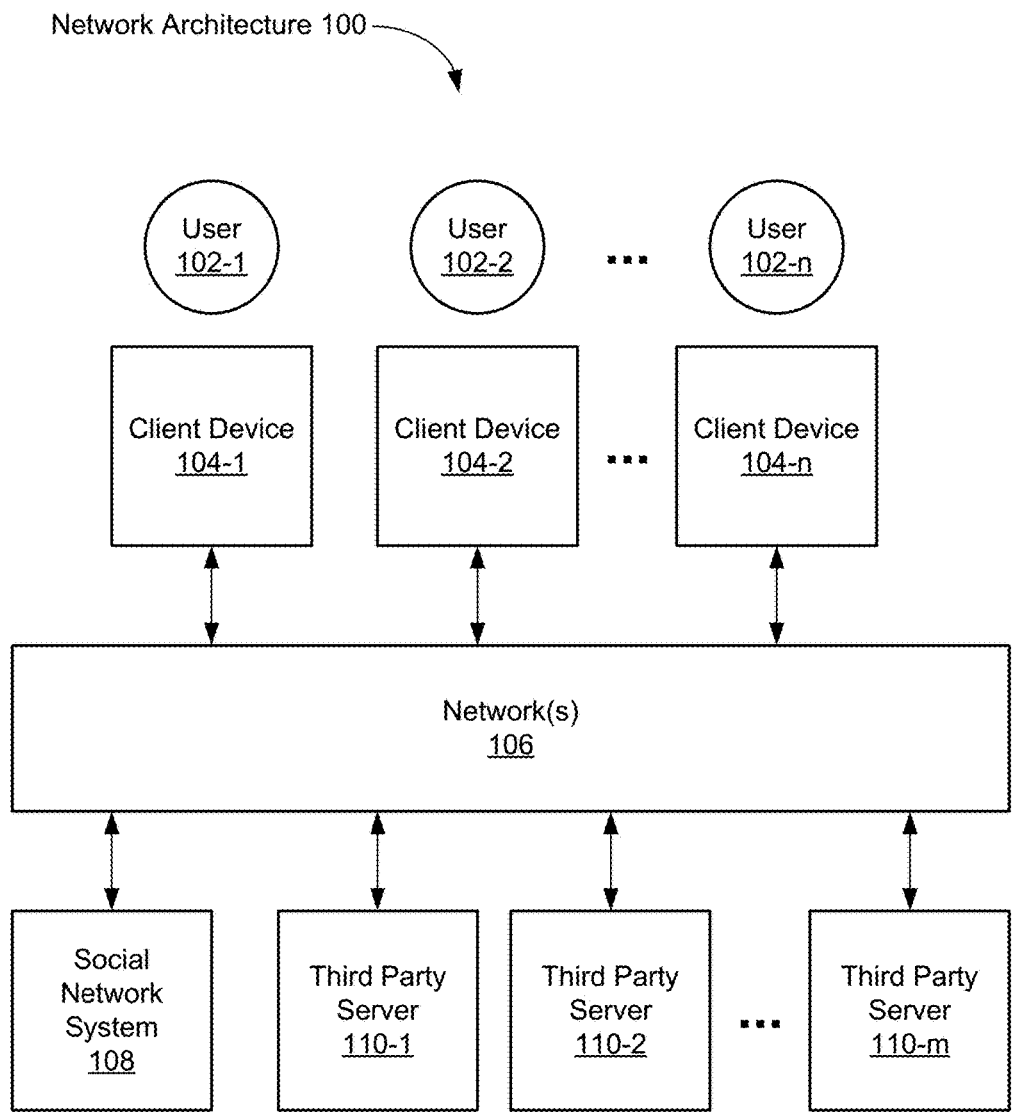
FIG. 1 is a block diagram illustrating an exemplary network architecture of a social network, in accordance with some embodiments.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first application programming interface could be termed a second application programming interface, and, similarly, a second application programming interface could be termed a first application programming interface, without departing from the scope of the various described embodiments. The first application programming interface and the second application programming interface are both application programming interfaces, but they are not the same application programming interface.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

As used herein, the term "exemplary" is used in the sense of "serving as an example, instance, or illustration" and not in the sense of "representing the best of its kind."

FIG. 1 is a block diagram illustrating an exemplary network architecture 100 of a social network, in accordance with some embodiments. The network architecture 100 includes a number of client devices (also called "client systems," "client computers," or "clients") 104-1, 104-2, . . . 104-n communicably connected to an electronic social network system 108 (e.g., a server system) by one or more networks 106 (e.g., the Internet, cellular telephone networks, mobile data networks, other wide area networks, local area networks, metropolitan area networks, and so on). In some embodiments, the one or more networks 106 include a public communication network (e.g., the Internet and/or a cellular data network), a private communications network (e.g., a private LAN or leased lines), or a combination of such communication networks.

In some embodiments, the client devices 104-1, 104-2, . . . 104-n are computing devices such as smart watches, personal digital assistants, portable media players, smart phones, tablet computers, 2D gaming devices, 3D (e.g., virtual reality) gaming devices, laptop computers, desktop computers, televisions with one or more processors embedded therein or coupled thereto, in-vehicle information systems (e.g., an in-car computer system that provides navigation, entertainment, and/or other information), and/or other appropriate computing devices that can be used to communicate with the social network system 108. In some embodiments, the social network system 108 is a single computing device such as a computer server, while in other embodiments, the social network system 108 is implemented by multiple computing devices working together to perform the actions of a server system (e.g., cloud computing).

Users 102-1, 102-2, . . . 102-n employ the client devices 104-1, 104-2, . . . 104-n respectively to access the social network system 108 and to participate in a corresponding social networking service provided by the social network system 108. For example, one or more of the client devices 104-1, 104-2, . . . 104-n execute software applications that are specific to the social networking service (e.g., social networking "apps" running on smart phones or tablets, such as a Facebook social networking application running on an iPhone, Android, or Windows smart phone or tablet). In some embodiments, the social network system 108 is a server system for a social networking service provider that provides access to at least some services and/or features for third-party providers. Users interacting with the client devices 104-1, 104-2, . . . 104-n can participate in the social networking service provided by the social network system 108 by providing and/or consuming (e.g., posting, writing, viewing, publishing, broadcasting, promoting, recommending, sharing, commenting on, liking) digital content, such as text comments (e.g., statuses, updates, posts, announcements, replies, location "check-ins," private/group messages), icons (emotion icons, feeling icons, status icons, state icons, emoticons, or emojis), images, photos, videos, audio files, links (e.g., to web pages, articles, pages associated with third-party service providers, etc.), documents, advertisements, and/or other electronic content. Users of the social networking service can also annotate information posted by other users of the social networking service (e.g., endorsing or "liking" a posting of another user, commenting on a post by another user or publishing source, and/or providing other types of user's feedback).

In connection with using or participating in a social networking service, the digital content that users may consume, provide, and/or otherwise interact with is accessible through various features or entry points of the social networking service. For example, digital content may be accessible and presented via one or more pages (e.g., user profile page, page for an entity or organization, etc.), feeds (e.g., a newsfeed, a user wall, a timeline, a notifications section for highlighting new/updates to digital content, etc.), applications, and/or other interfaces for specific types of digital content (e.g., interfaces for accessing private messages, accessing saved social network content, searching for social network content, etc.) maintained by and within the social networking service.

Figure 3:
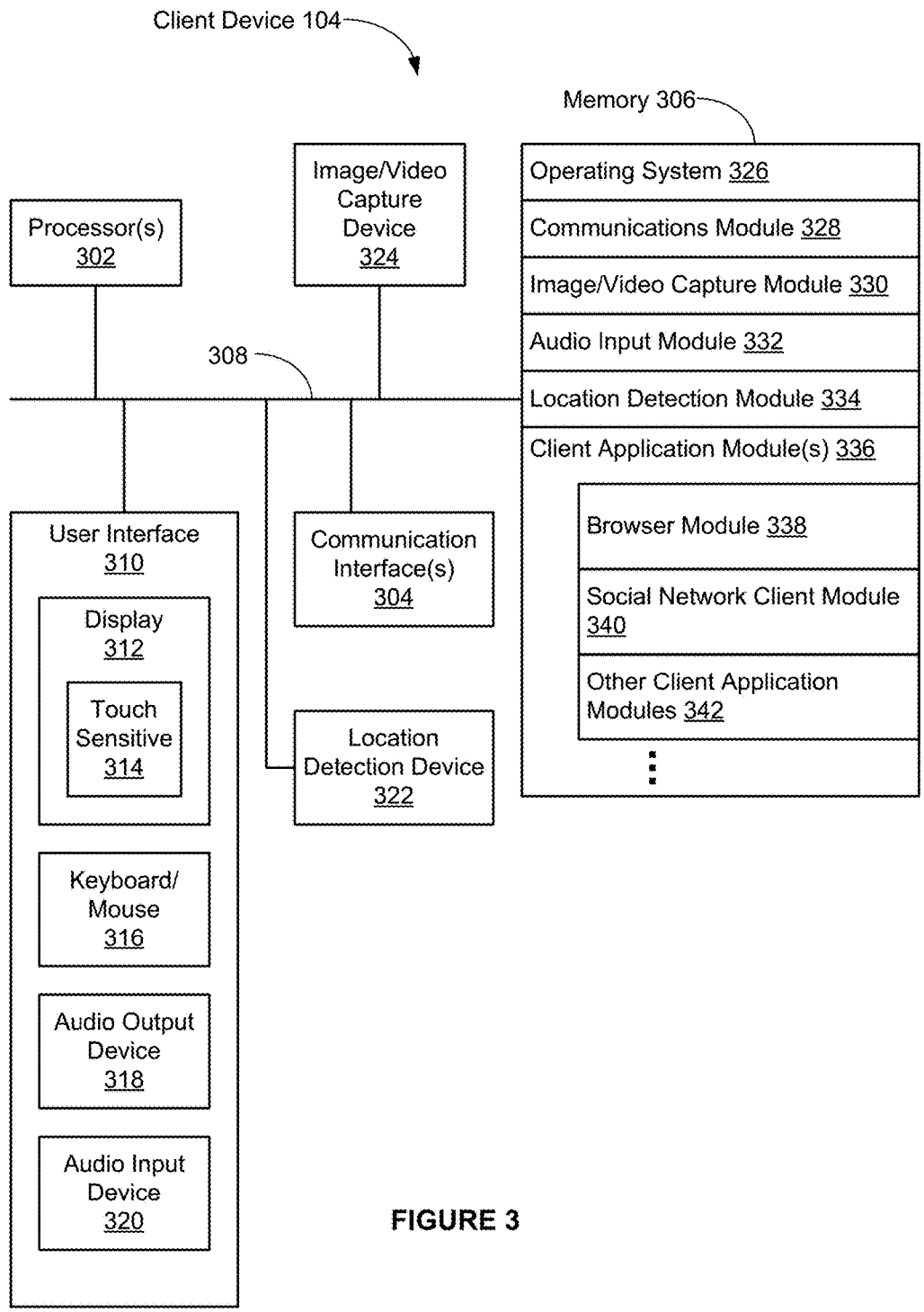
FIG. 3 is a block diagram illustrating an exemplary client device, in accordance with some embodiments.

In some embodiments, a software application executing on a mobile client device, with proper permissions, may obtain information from hardware resources/components of the client device (e.g., image/video capture device 324, location detection device 322, microphone, sensors, etc., FIG. 3). For example, global positioning system (GPS) or other geo-location capabilities (e.g., Wi-Fi or hybrid positioning systems) may be accessed by a software application on the client device (e.g., social network client module 340, FIG. 3) to determine the user's location and update the social network system 108 with the user's location (e.g., "At Home," "At Work," or "In San Francisco, Calif."), and/or update the social network system 108 with information derived from and/or based on the user's location. Users interacting with the client devices 104-1, 104-2, . . . 104-n can also use the social networking service provided by the social network system 108 to define groups of users. Users interacting with the client devices 104-1, 104-2, . . . 104-n can also use the social networking service provided by the social network system 108 to communicate and collaborate with each other.

In some embodiments, the network architecture 100 also includes third-party servers 110-1, 110-2, . . . 110-m. In some implementations, third-party servers 110 are associated with third-party service providers who provide services and/or features to users of a network (e.g., users of the social network system 108, FIG. 1). For example, in some embodiments, a given third-party server 110 is used to host third-party websites that provide web pages to client devices 104, either directly or in conjunction with the social network system 108. In some embodiments, a given third-party server 110 is used to host third-party applications that are used by client devices 104, either directly or in conjunction with the social network system 108.

In some embodiments, users may access third-party services by loading pages associated with third-party service providers within an application for a service provider distinct from the third-party service providers (e.g., by selecting links provided within social network client module 340 to access pages of a third-party service). Pages are a type of digital document that may include some common elements of other web documents (e.g., document includes markup language, such as Hyper Text Markup Language (HTML), Extensible Markup Language (XML), Java, etc.). Pages may also include script (e.g., JavaScript inserted into the page by the social network system 108) for calling one or more application programming interfaces (APIs) of a server system for the social networking service (e.g., one or more APIs of the social network system 108, FIG. 1) to obtain user information (e.g., location information, payment credentials, profile information, etc. collected and stored in connection with using the social networking service). The script may be executed at some time during a user's interaction with the loaded page (e.g., when the page is loaded, in response to a detected interaction within a loaded page, etc.).

Exemplary third-party services (e.g., provided by third-party service providers) include, but are not limited to, services, products, and/or applications for or related to: books, business, communication, contests, e-commerce (e.g., pages for purchasing goods or services from online retailers), education, entertainment, fashion, finance, food and drink, games, health and fitness, lifestyle, local information (e.g., pages for real-time viewing of mass transit schedules), movies (e.g., pages for movie reviews, purchasing movie tickets, etc.), television, music and audio, news, photos, video, productivity, reference material, security, shopping, sports, travel, utilities, and the like. In some embodiments, a given third-party server 110 is used to host enterprise systems, which are used by client devices 104, either directly or in conjunction with the social network system 108. In some embodiments, a given third-party server 110 is used to provide third-party content (e.g., news articles, reviews, message feeds, etc.).

In some embodiments, a given third-party server 110 is a single computing device (e.g., server computer), while in other embodiments, a given third-party server 110 is implemented by multiple computing devices working together to perform the actions of a server system (e.g., cloud computing).

Figure 2:
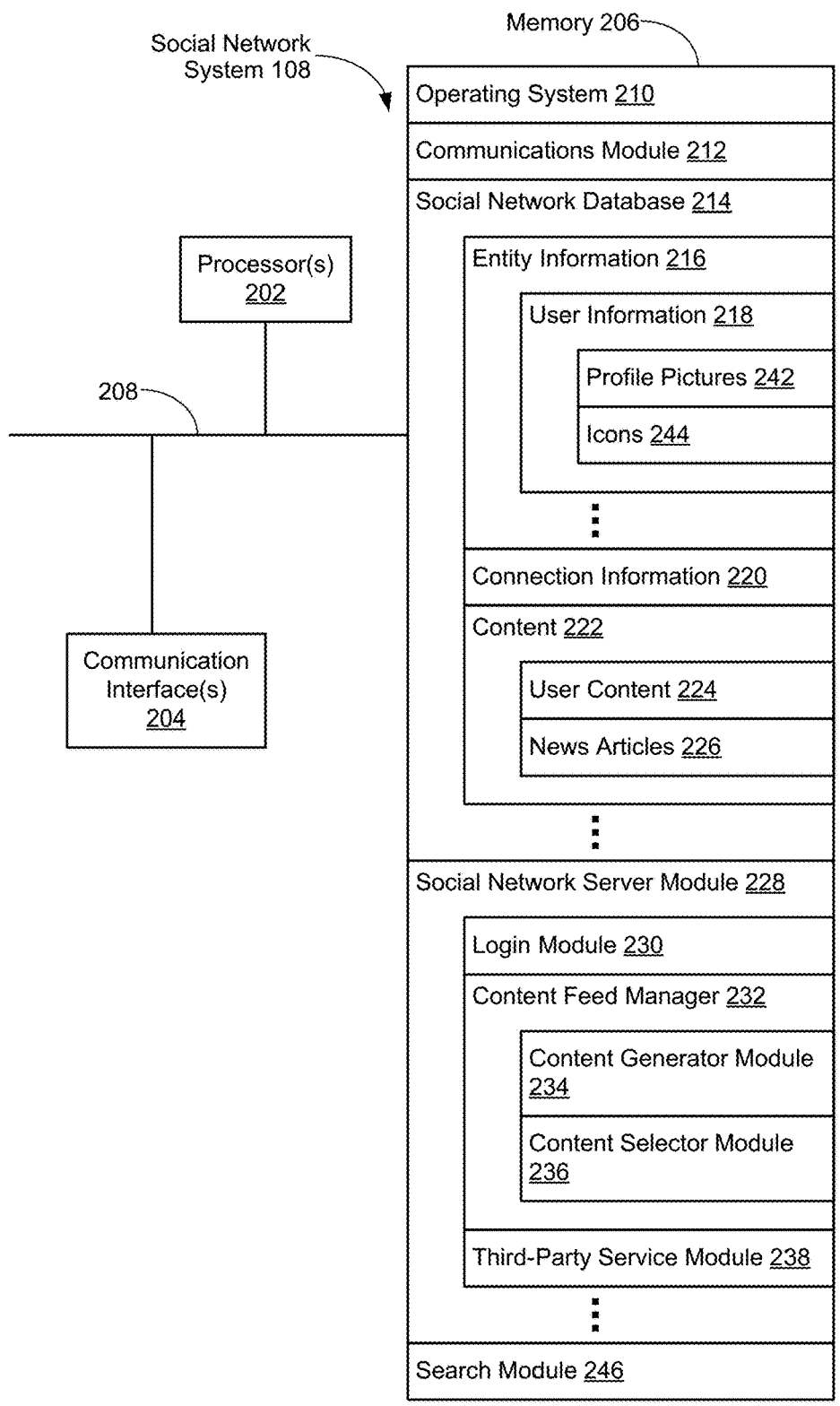
FIG. 2 is a block diagram illustrating an exemplary social network system, in accordance with some embodiments.

FIG. 2 is a block diagram illustrating an exemplary social network system 108, in accordance with some embodiments. The social network system 108 typically includes one or more processing units (processors or cores) 202, one or more network or other communications interfaces 204, memory 206, and one or more communication buses 208 for interconnecting these components. The communication buses 208 optionally include circuitry (sometimes called a chipset) that interconnects and controls communications between system components. The social network system 108 optionally includes a user interface (not shown). The user interface, if provided, may include a display device and optionally includes inputs such as a keyboard, mouse, trackpad, and/or input buttons. Alternatively or in addition, the display device includes a touch-sensitive surface, in which case the display is a touch-sensitive display.

Memory 206 includes high-speed random-access memory, such as DRAM, SRAM, DDR RAM, or other random-access solid-state memory devices; and may include non-volatile memory, such as one or more magnetic disk storage devices, optical disk storage devices, flash memory devices, and/or other non-volatile solid-state storage devices. Memory 206 may optionally include one or more storage devices remotely located from the processor(s) 202. Memory 206, or alternately the non-volatile memory device(s) within memory 206, includes a non-transitory computer-readable storage medium. In some embodiments, memory 206 or the computer-readable storage medium of memory 206 stores the following programs, modules and data structures, or a subset or superset thereof:

- an operating system 210 that includes procedures for handling various basic system services and for performing hardware dependent tasks;
- a network communication module 212 that is used for connecting the social network system 108 to other computers via the one or more communication network interfaces 204 (wired or wireless) and one or more communication networks (e.g., the one or more networks 106);
- a social network database 214 for storing data associated with the social networking service, such as:
  - entity information 216, such as user information 218, which includes user profile pictures 242 and a plurality of icons 244;
  - connection information 220; and
  - content 222, such as:
    - user content 224; and/or
    - news articles 226;
- a social network server module 228 for providing social networking services and related features (e.g., in conjunction with social network client module 340 on the client device 104, FIG. 3), which includes:
  - a login module 230 for logging a user 102 at a client device 104 into the social network system 108;
  - a content feed manager 232 for providing content to be sent to clients 104 for display, which includes:
    - a content generator module 234 for adding objects to the social network database 214, such as images, videos, audio files, comments, status messages, links, applications, and/or other entity information 216, connection information 220, or content 222; and a content selector module 236 for choosing the information/content to be sent to clients 104 for display; and a third-party service module 238 for providing users access to services of third-party service providers using an application (e.g., social network module 340, FIG. 3) for a social networking service (e.g., provided by the social network system 108); and a search module 246 for enabling users of the social network system to search for content and other users in the social network.

The social network database 214 stores data associated with the social network in one or more types of databases, such as graph, dimensional, flat, hierarchical, network, object-oriented, relational, and/or XML databases.

In some embodiments, the social network database 214 includes a graph database, with entity information 216 represented as nodes in the graph database and connection information 220 represented as edges in the graph database. The graph database includes a plurality of nodes, as well as a plurality of edges that define connections between corresponding nodes. In some embodiments, the nodes and/or edges themselves are data objects that include the identifiers, attributes, and information for their corresponding entities, some of which are rendered at clients 104 on corresponding profile pages or other pages in the social networking service. In some embodiments, the nodes also include pointers or references to other objects, data structures, or resources for use in rendering content in conjunction with the rendering of the pages corresponding to the respective nodes at clients 104.

Entity information 216 includes user information 218, such as user profiles, user profile pictures, a plurality of icons, login information, payment credentials (e.g., credit-card or debit-card information, bank information, etc. for conducting financial transactions through the social networking service), privacy and other preferences, biographical data, and the like. In some embodiments, for a given user, the user information 218 includes the user's name, profile picture, a plurality of icons, contact information, birth date, sex, marital status, family status, employment, education background, preferences, interests, and/or other demographic information.

In some embodiments, entity information 216 includes information about a physical location (e.g., a restaurant, theater, landmark, city, state, or country), real or intellectual property (e.g., a sculpture, painting, movie, game, song, idea/concept, photograph, or written work), a business, a group of people, and/or a group of businesses. In some embodiments, entity information 216 includes information about a resource, such as an audio file, a video file, a digital photo, a text file, a structured document (e.g., web page), or an application. In some embodiments, the resource is located in the social network system 108 (e.g., in content 222) or on an external server, such as third-party server 110.

In some embodiments, connection information 220 includes information about the relationships between entities in the social network database 214. In some embodiments, connection information 220 includes information about edges that connect pairs of nodes in a graph database. In some embodiments, an edge connecting a pair of nodes represents a relationship between the pair of nodes.

In some embodiments, an edge includes or represents one or more data objects or attributes that correspond to the relationship between a pair of nodes. For example, when a first user indicates that a second user is a "friend" of the first user, the social network system 108 transmits a "friend request" to the second user. If the second user confirms the "friend request," the social network system 108 creates and stores an edge connecting the first user's user node and the second user's user node in a graph database as connection information 220 that indicates that the first user and the second user are friends. In some embodiments, connection information 220 represents a friendship, a family relationship, a business or employment relationship, a fan relationship, a follower relationship, a visitor relationship, a subscriber relationship, a superior/subordinate relationship, a reciprocal relationship, a non-reciprocal relationship, another suitable type of relationship, or two or more such relationships.

In some embodiments, an edge between a user node and another entity node represents connection information about a particular action or activity performed by a user of the user node towards the other entity node. For example, a user may "like" or have "attended," "played," "listened," "cooked," "worked at," or "watched" the entity at the other node. The page in the social networking service that corresponds to the entity at the other node may include, for example, a selectable "like," "check in," or "add to favorites" icon. After the user clicks one of these icons, the social network system 108 may create a "like" edge, "check in" edge, or a "favorites" edge in response to the corresponding user action. As another example, the user may listen to a particular song using a particular application (e.g., an online music application). In this case, the social network system 108 may create a "listened" edge and a "used" edge between the user node that corresponds to the user and the entity nodes that correspond to the song and the application, respectively, to indicate that the user listened to the song and used the application. In addition, the social network system 108 may create a "played" edge between the entity nodes that correspond to the song and the application to indicate that the particular song was played by the particular application.

In some embodiments, content 222 includes text (e.g., ASCII, SGML, HTML), images (e.g., jpeg, tif and gif), graphics (e.g., vector-based or bitmap), audio, video (e.g., mpeg), other multimedia, and/or combinations thereof. In some embodiments, content 222 includes executable code (e.g., script for API calls), podcasts, links, and the like.

In some embodiments, the social network server module 228 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

In some implementations, third-party servers 110 (FIG. 1) include some or all of the same components, modules, and sub-modules as described above in FIG. 2 for the social network system 108.

FIG. 3 is a block diagram illustrating an exemplary client device 104, in accordance with some embodiments. The client device 104 typically includes one or more processing units (processors or cores) 302, one or more network or other communications interfaces 304, memory 306, and one or more communication buses 308 for interconnecting these components. The communication buses 308 optionally include circuitry (sometimes called a chipset) that interconnects and controls communications between system components. The client device 104 includes a user interface 310. The user interface 310 typically includes a display device 312. In some embodiments, the client device 104 includes inputs such as a keyboard, mouse, and/or other input buttons 316. Alternatively or in addition, in some embodiments, the display device 312 includes a touch-sensitive surface 314, in which case the display device 312 is a touch-sensitive display. In some embodiments, the touch-sensitive surface 314 is configured to detect various swipe gestures (e.g., continuous gestures in vertical and/or horizontal directions) and/or other gestures (e.g., single/double tap). In client devices that have a touch-sensitive display 312, a physical keyboard is optional (e.g., a soft keyboard may be displayed when keyboard entry is needed). The user interface 310 also includes an audio output device 318, such as speakers or an audio output connection connected to speakers, earphones, or headphones. Furthermore, some client devices 104 use a microphone and voice recognition to supplement or replace the keyboard. Optionally, the client device 104 includes an audio input device 320 (e.g., a microphone) to capture audio (e.g., speech from a user). Optionally, the client device 104 includes a location detection device 322, such as a GPS (global positioning satellite) or other geo-location receiver, for determining the location of the client device 104. The client device 104 also optionally includes an image/video capture device 324, such as a camera or webcam.

In some embodiments, the client device 104 includes one or more optional sensors (e.g., gyroscope, accelerometer) for detecting a motion and/or change in orientation of the client device. In some embodiments, a detected motion and/or orientation of the client device 104 (e.g., the motion/change in orientation corresponding to a user input produced by a user of the client device) is used to manipulate an interface (or content within the interface) displayed on the client device 104.

Memory 306 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 306 may optionally include one or more storage devices remotely located from the processor(s) 302. Memory 306, or alternately the non-volatile memory device(s) within memory 306, includes a non-transitory computer-readable storage medium. In some embodiments, memory 306 or the computer-readable storage medium of memory 306 stores the following programs, modules, and data structures, or a subset or superset thereof:

- an operating system 326 that includes procedures for handling various basic system services and for performing hardware dependent tasks;
- a network communication module 328 that is used for connecting the client device 104 to other computers via the one or more communication network interfaces 304 (wired or wireless) and one or more communication networks, such as the Internet, cellular telephone networks, mobile data networks, other wide area networks, local area networks, metropolitan area networks, and so on;
- an image/video capture module 330 (e.g., a camera module) for processing a respective image or video captured by the image/video capture device 324, where the respective image or video may be sent or streamed (e.g., by a client application module 336) to the social network system 108;
- an audio input module 332 (e.g., a microphone module) for processing audio captured by the audio input device 320, where the respective audio may be sent or streamed (e.g., by a client application module 336) to the social network system 108;
- a location detection module 334 (e.g., a GPS, Wi-Fi, or hybrid positioning module) for determining the location of the client device 104 (e.g., using the location detection device 322) and providing this location information for use in various applications (e.g., social network client module 340); and
- one or more client application modules 336, including the following modules (or sets of instructions), or a subset or superset thereof:
  - a web browser module 338 (e.g., Internet Explorer by Microsoft, Firefox by Mozilla, Safari by Apple, or Chrome by Google) for accessing, viewing, and interacting with web sites;
  - a social network module 340 for providing an interface to a social networking service (e.g., a social networking service provided by social network system 108) and related features, and for loading (e.g., within the interface for the social network module 340) pages associated with third-party service providers (e.g., to conduct transactions with the third-party service providers); and/or
  - optional client application modules 342, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

Each of the above identified modules and applications correspond to a set of executable instructions for performing one or more functions as described above and/or in the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 206 and/or 306 store a subset of the modules and data structures identified above. Furthermore, memory 206 and/or 306 optionally store additional modules and data structures not described above.

Attention is now directed towards embodiments of graphical user interfaces ("GUIs") and associated processes that may be implemented on a client device (e.g., the client device 104 in FIG. 3).

Figure 4:
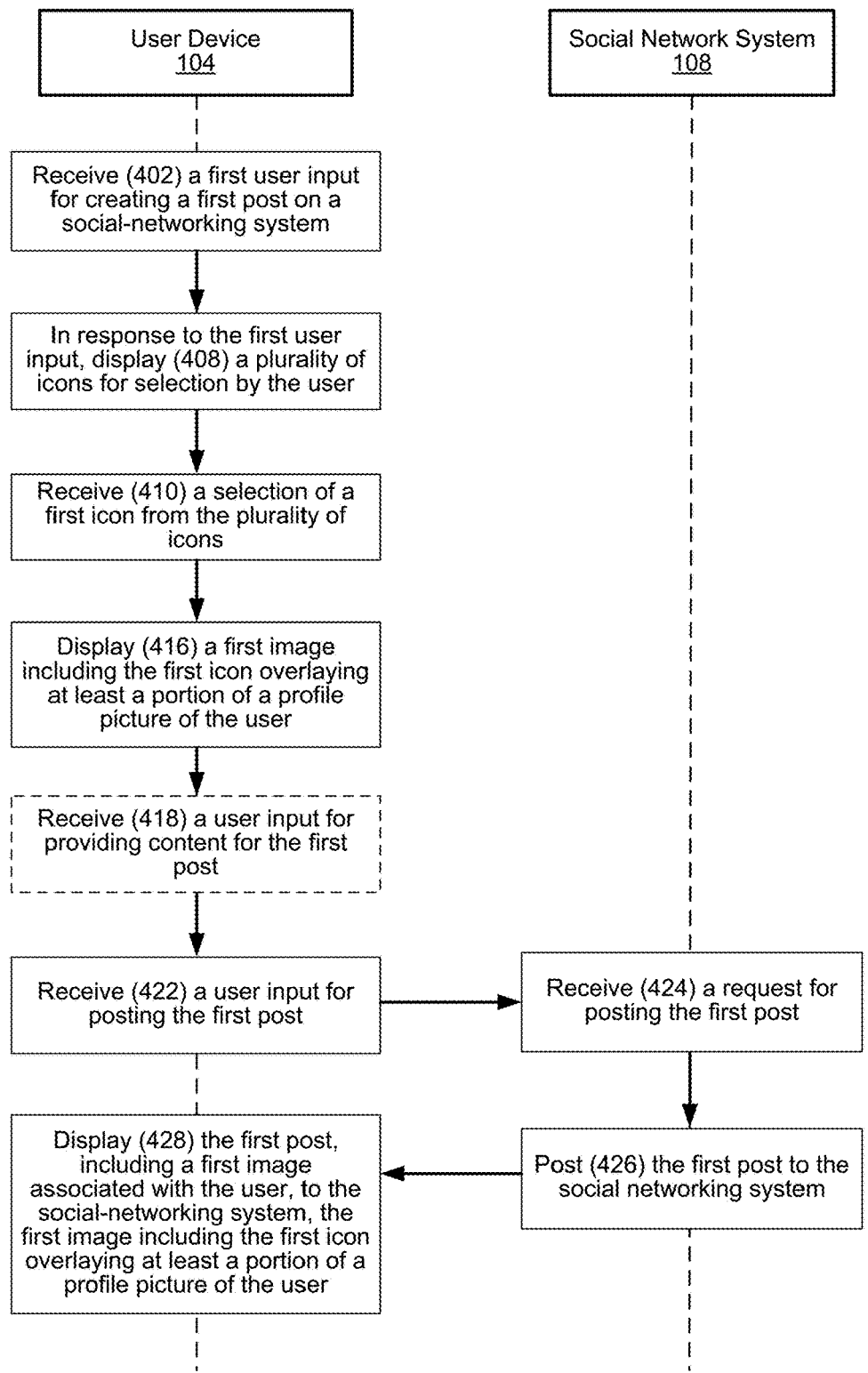
FIG. 4 is a flow diagram illustrating a method of creating an icon overlaying at least a portion of a profile picture of a user on a social networking system, in accordance with some embodiments.

FIG. 4 is a flow diagram illustrating a method 400 of creating an icon overlaying at least a portion of a profile picture of a user on a social networking system, in accordance with some embodiments. The steps of the method 400 may be performed by any combination of client device 104 (FIGS. 1, 3, 5A-5F) and/or social network system 108 (FIGS. 1 and 2). FIG. 4 corresponds to instructions stored in computer memory (e.g., memory 306 of the client device 104, FIG. 3; memory 206 of the social network system 108, FIG. 2) or another computer-readable storage medium. To assist with describing the method 400, FIG. 4 will be described with reference to the exemplary GUIs illustrated in FIGS. 5A-5F.

FIGS. 5A-5F illustrate exemplary GUIs on a client device 104 for creating an icon overlaying at least a portion of a profile picture of a user on a social networking system, in accordance with some embodiments. For example, the GUIs shown in FIGS. 5A-5F may be provided by an application for a social networking service (e.g., social network module 340, FIG. 3). The GUIs in these figures are used to illustrate the processes described below, including the method 400 (FIG. 4). While FIGS. 5A-5F illustrate examples of GUIs, in other embodiments, one or more GUIs display user-interface elements in arrangements distinct from the embodiments of FIGS. 5A-5F.

In performing method 400, the client device 104 receives (402) a user input from a user for creating a first post on a social networking system. In some embodiments, the post is related to a user state (i.e., user's status). For example, FIG. 5A displays a feed of social network content for a user account associated with a profile picture 510. The feed includes a plurality of posts, including posts from contacts of the user (e.g., posts 512 and 514) and news posts (e.g., post 516). The news posts may be recommended to the user by the social networking system or subscribed to by the user to follow on the social networking system. The client device 104 receives a user input 502 (e.g., a touch input or a gesture input) near the button "Status" on the display to compose a post related to the user's status.

In some embodiments, in response to the user input 502, the client device 104 displays one or more options for expressing the user's status for the user's selection. For example, as shown in FIG. 5B, the options of expressing the user's status include writing texts/symbols, capturing and posting photos and/or videos, broadcasting a live video, tagging friends, expressing feeling and/or activity of the user, creating a slideshow, and/or check-in at the current user location. In some embodiments, each option is associated with a template for composing the post. For example, the option of expressing feeling and/or activity of a user is associated with a template: [user name]+"is"+[a selected icon]+"feeling"+[a predefined description of the selected icon]. In another example, the option of check-in at the current user location is associated with a template: [user name]+"is at"+[user location]. In some embodiments, the client device 104 receives a user input 518 for creating a post to express the user's feeling and/or activity.

In response to a user input, the user device 104 displays (408) an icon panel 520 listing a plurality of icons for selection by the user. In some embodiments, the plurality of icons are displayed in response to the user input 518 of selecting to post a feeling/activity of the user. In some other embodiments, the plurality of icons are displayed in response to the user input 502 for posting a status of the user. The plurality of icons are displayed in the icon panel 520 as an array or grid. In some embodiments, the plurality of icons visually represent respective user states. A respective icon of the plurality of icons visually represents a declared state of the user. In some embodiments, the declared state of the user comprises an emotional state or an activity of the user. In some embodiments, each icon of the plurality of icons is associated with a predefined description of the feeling/activity represented by the corresponding icon. The predefined description is displayed next to the corresponding icon. The predefined description may be included in a post created by the user after selecting the corresponding icon. In some embodiments, after the user selects an icon, a post is created to include the selected icon and the associated predefined description of the selected icon without any further user interaction. For example, as shown in FIG. 5C, the plurality of icons include a visual representation of a user feeling excited. The predefined description "excited" is displayed next to this corresponding icon. Similarly, the icon panel 520 includes a plurality of icons displayed with corresponding descriptions of "blessed," "happy," "cool," "loved," "determined," "sad," "amused," "thankful," "annoyed," "sick," "emotional," "positive," "proud," "pissed off," and "heartbroken."

The client device 104 receives (410) a selection of an icon from the plurality of icons. For example as shown in FIG. 5C, the client device 104 receives a user input 522 for selecting the icon for "excited" to express his or her feeling of excitement.

The client device 104 then displays (416) a post that is being composed by the user. The post under composing includes an image including the selected icon overlaying at least a portion of a profile picture of the user, a user's status that is generated based on the corresponding template, and a content composer that allows the user to input further texts and/or symbols to express the user's feeling/activity. For example, as shown in FIG. 5D, after the user selects the icon for "excited," the client device 104 displays a post 523 including an image 528 that includes the selected icon for "excited" overlaying the profile picture 527 of the user. In some embodiments, the icon is smaller than the profile picture of the user. In some embodiments, the icon is offset from a center of the profile picture in the image 528. For example, the icon is located at a corner (e.g., an upper left corner, FIG. 5D) of the profile picture 527. In some embodiments, the post 523 also includes a user's status 524 that is generated using the template associated with the option of user's feeling/activity. The user's status 524 may be generated without any further user interaction/user input. In some embodiments, the user's status 524 is generated by plugging, by the system, the selected icon and the predefined description of the selected icon into corresponding places of the template. For example, as shown in FIG. 5D, the user's status 524 is generated, by the system without any further user interaction, to read "John Doe is ☻ feeling excited." In some embodiments, the post 523 further includes a content composer 526 for the user to type in texts and/or symbols as content of the post. In some embodiments, the image includes a visual indicator 529 (e.g., a cross) overlaying the image 528 (e.g., overlaying the icon in the image 528) to provide the user an option of opting out of having the icon overlay the profile picture 527.

In some embodiments, the client device 104 receives (418) a user input providing content for the post. For example as shown in FIG. 5D, the user types in "Pretty cool!" in the content composer 526. After finishing composing the post, the client device 104 receives (422) a user input for posting the post. For example, as shown in FIG. 5D, the client device 104 receives a user input 530, such as a user interaction with the button "post," for posting the composed post.

In some embodiments, the client device 104 generates a request in response to the user input 530 for posting the composed post. The client device 104 sends the request to the social network system 108. The social network system 108 receives (424) the request for posting the post of the user to the social networking system. In some embodiments, the social network system 108 then posts (426) the post to the social networking system.

The client device 104 posts (428) the post including the image associated with the user to the social networking system. The image includes the selected icon overlaying at least a portion of a profile picture of the user. The posting (428) also includes posting the content received (418) from the user with the image to the social networking system. The post also includes the generated user's status. For example, as shown in FIG. 5E, in response to the user input 530, the post 532 is posted. The post 532 includes image 528, user's status 524, and content 526 of the post.

In some other embodiments, the user selects to submit the post without providing any content for the post. The published post will include the image including the icon overlaying the user profile picture and the user's status which is generated based on a template.

After posting (428) the post, a profile of the user is updated with the image including the selected icon overlying the profile picture of the user. For example as shown in FIG. 5E, in addition to the update to the profile picture in post 532, the profile picture of the user on another presence, e.g., status update box 534, is also updated to display the image including the icon overlaying the profile picture of the user. Furthermore, as shown in FIG. 5F, the profile picture 536 of the user on the user's profile page is also updated to display the image 533 including the icon 535 overlaying the profile picture 536 of the user. In some embodiments, other presences of the user's profile picture include, but are not limited to, the user's profile picture shown in status update box 534, profile picture 536 on the user's profile page, profile picture on the user's feed, and profile picture in one or more other applications related to the social networking system. In some embodiments, the selected icon is displayed to be associated with the user profile on all presences on the social networking system, including in another application related to the social networking system, such as Facebook Messenger.

Figure 6:
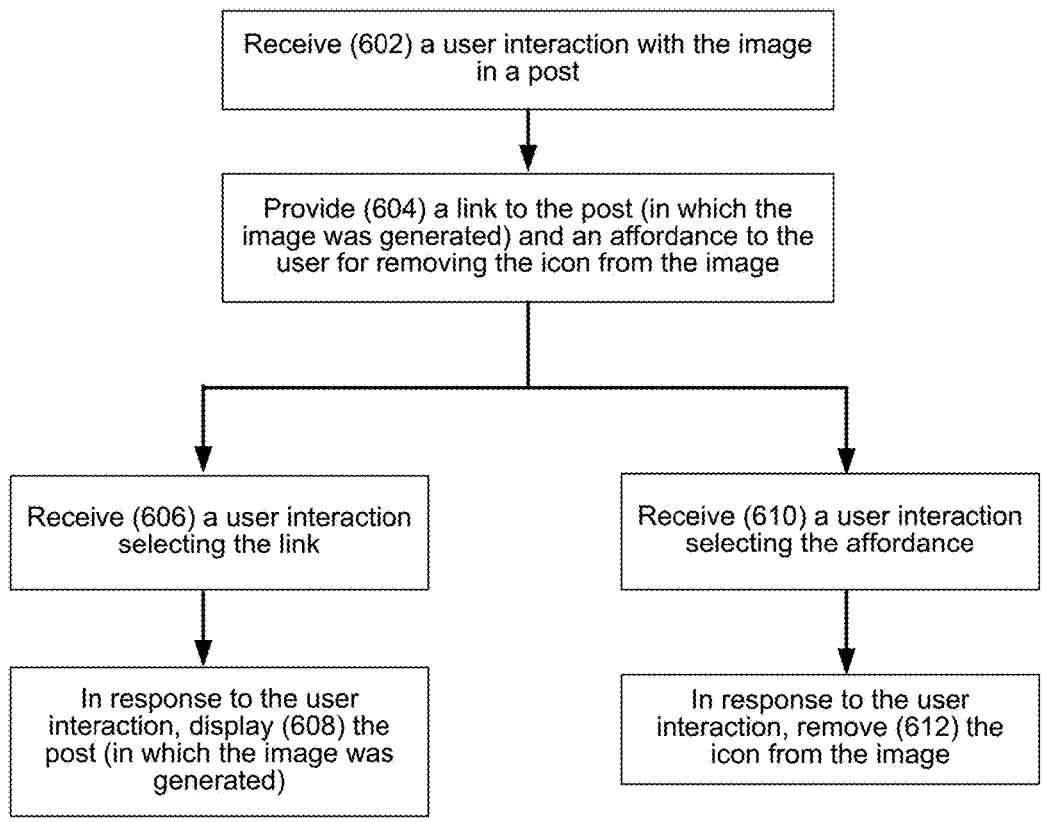
FIG. 6 is a flow diagram illustrating a method of interacting with an image including an icon overlaying a profile picture of a user on a social networking system, in accordance with some embodiments.

FIG. 6 is a flow diagram illustrating a method 600 of interacting with an image including an icon overlaying a profile picture of a user on a social networking system, in accordance with some embodiments. The steps of the method 600 may be performed by any combination of client device 104 (FIGS. 1, 3, 7A-7D) and/or social network system 108 (FIGS. 1 and 2). FIG. 6 corresponds to instructions stored in computer memory (e.g., memory 306 of the client device 104, FIG. 3; memory 206 of the social network system 108, FIG. 2) or another computer-readable storage medium. To assist with describing the method 600, FIG. 6 will be described with reference to the exemplary GUIs illustrated in FIGS. 7A-7D.

FIGS. 7A-7D illustrate exemplary GUIs on a client device 104 for interacting with an image including an icon overlaying a profile picture of a user on a social networking system, in accordance with some embodiments. For example, the GUIs shown in FIGS. 7A-7D may be provided by an application for a social networking service (e.g., social network module 340, FIG. 3). The GUIs in these figures are used to illustrate the processes described below, including the method 600 (FIG. 6). While FIGS. 7A-7D illustrate examples of GUIs, in other embodiments, one or more GUIs display user-interface elements in arrangements distinct from the embodiments of FIGS. 7A-7D.

In performing method 600, the client device 104 receives (602) a user interaction with the image including an icon overlaying the profile picture in a post. In some embodiments, the user interaction is received from the user himself or herself, i.e., the account holder. The post is created by the user and the post with which the user interacts is distinct from the post in which the current image was generated. For example, the user right clicks or hovers a pointer over the image or the icon in the image. In response to the user interaction, the client device 104 provides (604) a link to the post in which the image was generated. In some embodiments, in response to the user interaction, the client device 104 also provides (604) an affordance to the user for removing the icon from the image.

Figure 7A:
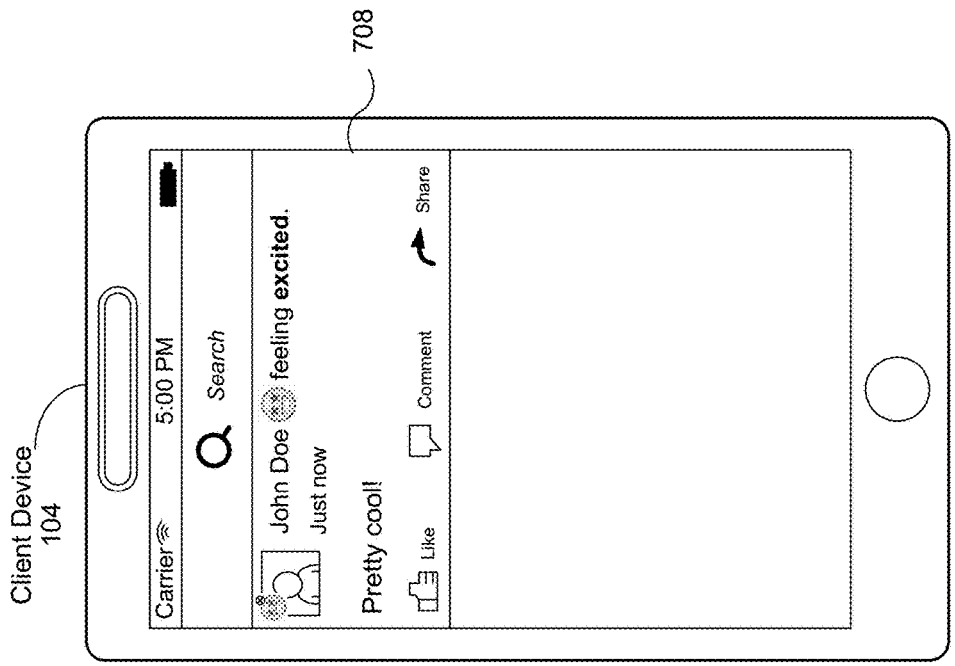
FIGS. 7A-7D illustrate exemplary GUIs on a client device for interacting with an image including an icon overlaying a profile picture of a user on a social networking system, in accordance with some embodiments.

As an exemplary example shown in FIG. 7A, the client device 104 receives a user interaction 702 with the icon in the image of the user profile. The user interaction 702 may be received from the user himself or herself. In response to the user interaction 702, the client device 104 displays a selector 704 including options (1) to see the post in which the image was generated (e.g., "Go To Post,") (2) to remove the icon from the image (e.g., "Remove Icon,") and (3) to cancel any request generated from the user interaction 702 without any changes (e.g., "Cancel.") In some embodiments, the button "Go to Post" is associated with the link to the post in which the image was generated such that when a user interaction with the button "Go To Post" is received, the user interface is redirected to the post in which the image was generated. Such a button creates a short-cut for the user to locate the post in which the image was generated.

Figure 7B:
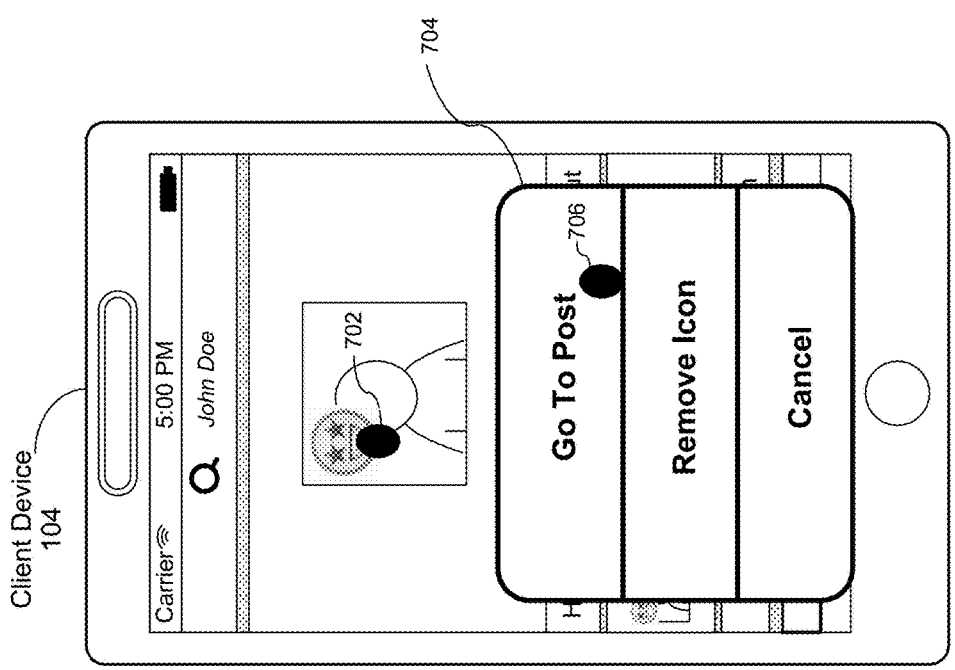

In some embodiments, the client device 104 receives (606) a user interaction selecting the link to the post in which the image was generated. In response to the user interaction, the client device 104 displays (608) the post in which the image was generated. For example, as shown in FIG. 7A, the client device 104 receives the user interaction 706 with the option "Go To Post." As shown in FIG. 7B, the client device 104 is redirected to the post 708 in which the image was generated (as discuss with post 532 in FIG. 5E.)

Figure 7D:
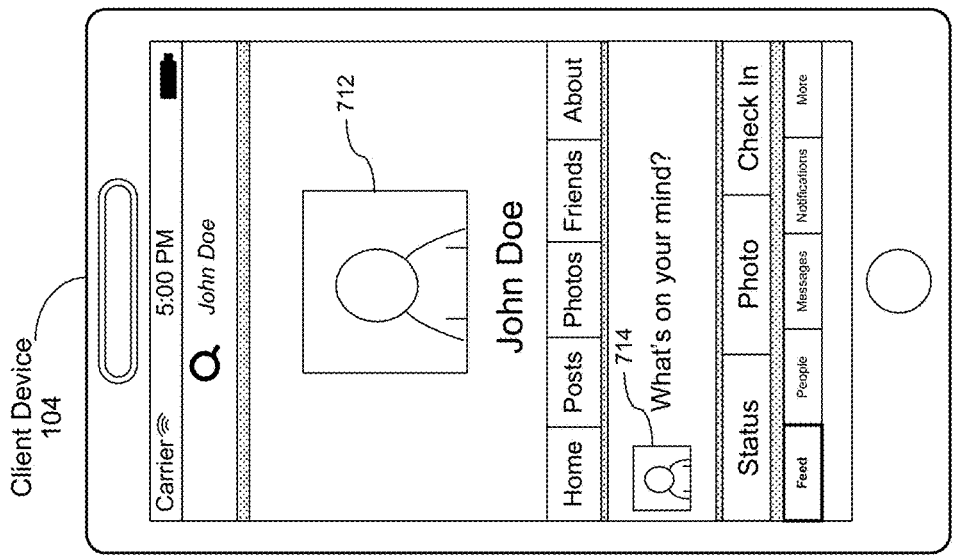
Figure 7C:
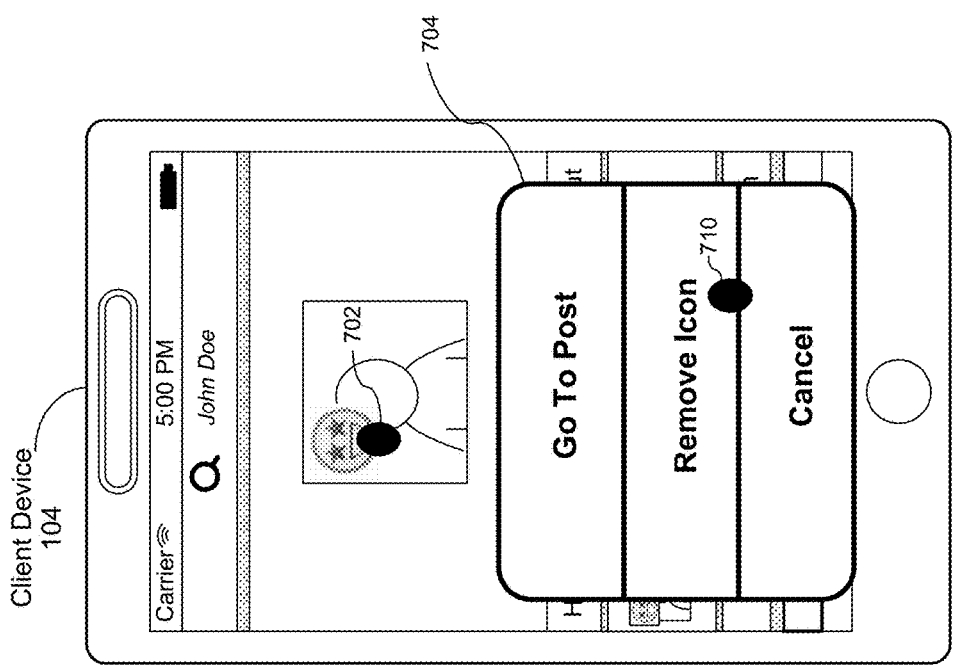

In some embodiments, the client device 104 receives (610) a user selection of the affordance to the user for removing the icon from the image. In response to the user interaction, the client device 104 removes (612) the icon from the image. For example as shown in FIG. 7C, the client device 104 receives the user interaction 710 with the option "Remove Icon." As shown in FIG. 7D, the icon is removed from the image and only the profile pictures 712 and 714 are displayed in the user account.

FIGS. 8A-8D illustrate exemplary GUIs on a client device 104 for updating an image of a user on a social networking system, in accordance with some embodiments. For example, the GUIs shown in FIGS. 8A-8D may be provided by an application for a social networking service (e.g., social network module 340, FIG. 3). The GUIs in these figures are used to illustrate the processes described below. While FIGS. 8A-8D illustrate examples of GUIs in some embodiments, in other embodiments, one or more GUIs display user-interface elements in arrangements distinct from the embodiments of FIGS. 8A-8D.

In some embodiments, after posting a post (e.g., post 802, FIG. 8A) to add an icon to the user profile, the user can further interact with the social networking system to update the image on the social networking system. In some embodiments, the client device 104 receives a user input (e.g., a user interaction) to create another post on the social networking system. For example, as shown in FIG. 8A, a user interaction 804 is received on the "Status" button for updating the user's status. In some embodiments, the user further selects to publish a post to show his or her feeling/activity.

In response to the user interaction, the client device 104 displays the plurality of icons for selection by the user. The client device 104 then receives a selection from the user of an icon from the plurality of icons. In some embodiments, the icon selected this time is different from the icon currently associated with the user profile. For example, as shown in FIG. 8B, the user selects the icon 812 for "thankful" to express his or her current feeling of thankfulness. The icon 812 for "thankful" will replace the previous icon for "excited." After selecting the icon 812 for "thankful," an image 816 including the icon 812 for "thankful" overlaying the user profile 814 is displayed on the user device 104. In addition, the user's status 818 is generated based on the template associated with the option of user's feeling/activity. As shown in FIG. 8B, the user's status 818 is generated, without user's further interaction, to show "John Doe is ☺ feeling thankful." The client device 104 further receives a user input, such as a user interaction 820 with the button "post," for posting the composed post 822.

In response to the user interaction 820, the client device 104 posts the post 822 to the social networking system. The post 822 includes the image 816 associated with the user. The image 816 includes the selected icon 812 overlaying at least a portion of the user profile picture 814.

Figures 8C, 8D:
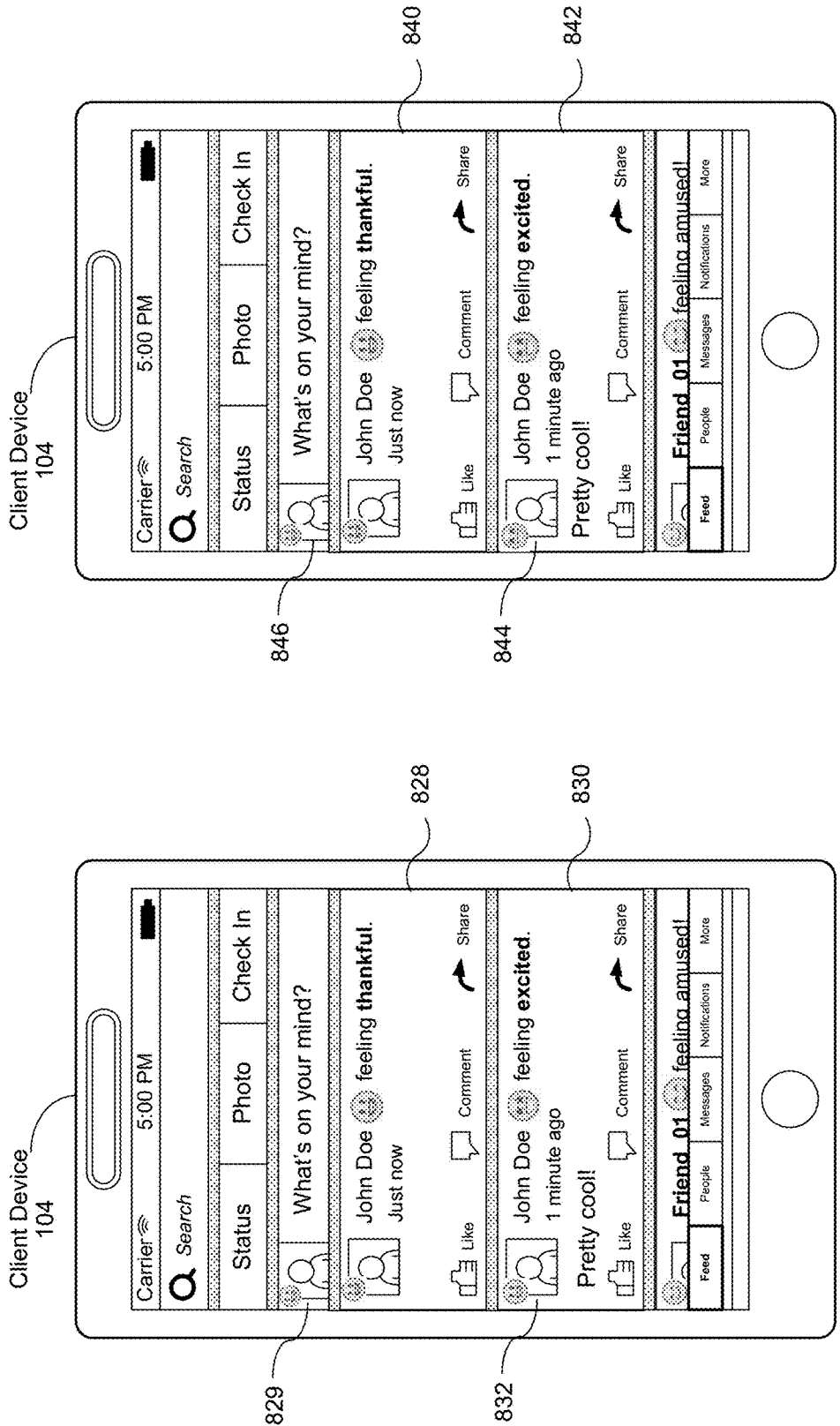

After posting the post for updating the image, the social networking system may provide different options for displaying the image. In some embodiments, after posting the current post, the social networking system replaces the previous image with the current image in one or more posts of the user to the social networking system that precede the current post. For example, as shown in FIG. 8C, after posting the post 828 to update the user's status to "feeling thankful," the social networking system updates the user profile to include the image 829 having the icon for "thankful" overlaying the profile picture. The social networking system also replaces the previous image in the previous post, e.g., image 832 in previous post 830, to include the icon for "thankful" overlaying the profile picture.

In some embodiments, after posting the current post, the social networking system uses the current image only in future posts without replacing the previous images in the old posts. That is, the current image is displayed in one or more posts of the user to the social networking system that follow the current post. The previous image is still displayed in one or more posts of the user to the social networking system that precede the current post. For example, as shown in FIG. 8D, after posting the post 840 to update the user's status to "feeling thankful," the social networking system updates the user profile to include the image 846 having the icon for "thankful" overlaying the profile picture. The social networking system does not replace the previous image in the previous post. For example, the post 842 preceding the post 840 still uses the previous image 844 including the icon for "excited" overlaying the profile picture. One or more posts (not shown) that follow the post 840, e.g., without changing user's status, will show the image 846 including the icon for "thankful" overlaying the profile picture FIGS. 9A-9E illustrate exemplary GUIs on a client device 104 for updating an image of a user on a social networking system, in accordance with some embodiments. For example, the GUIs shown in FIGS. 9A-9E may be provided by an application for a social networking service (e.g., social network module 340, FIG. 3). The GUIs in these figures are used to illustrate the processes described below. While FIGS. 9A-9E illustrate examples of GUIs in some embodiments, in other embodiments, one or more GUIs display user-interface elements in arrangements distinct from the embodiments of FIGS. 9A-9E.

In some embodiments, the client device 104 receives a user input to create a post on the social networking system. For example, as shown in FIG. 9A, the client device 104 receives a user interaction 902 with the button "status" for updating the user's status on the social networking system. In response to the user input, the client device 104 displays the plurality of icons as discussed with reference to FIG. 5C.

The client device then receives a selection of an icon from the plurality of icons for the current post. In response to the user's selection, the client device displays an image including the selected icon overlaying at least a portion of the profile picture of the user.

Figure 9B:
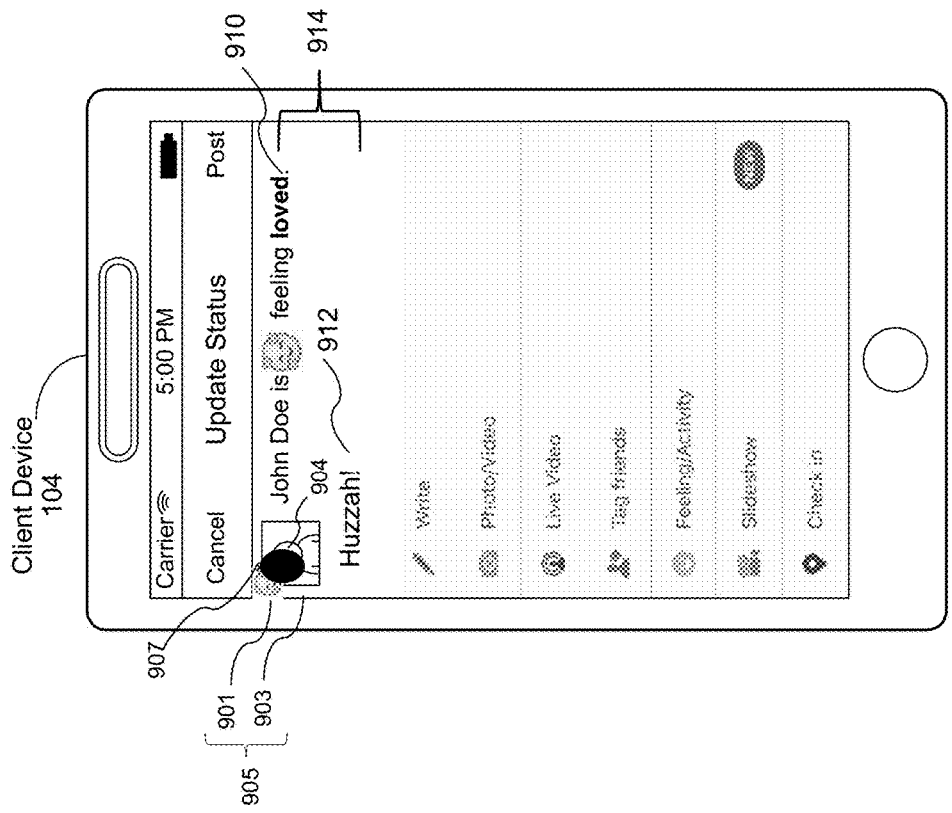
FIGS. 9A-9E illustrate exemplary GUIs on a client device for updating an image of a user on a social networking system, in accordance with some embodiments.
Figure 9A:
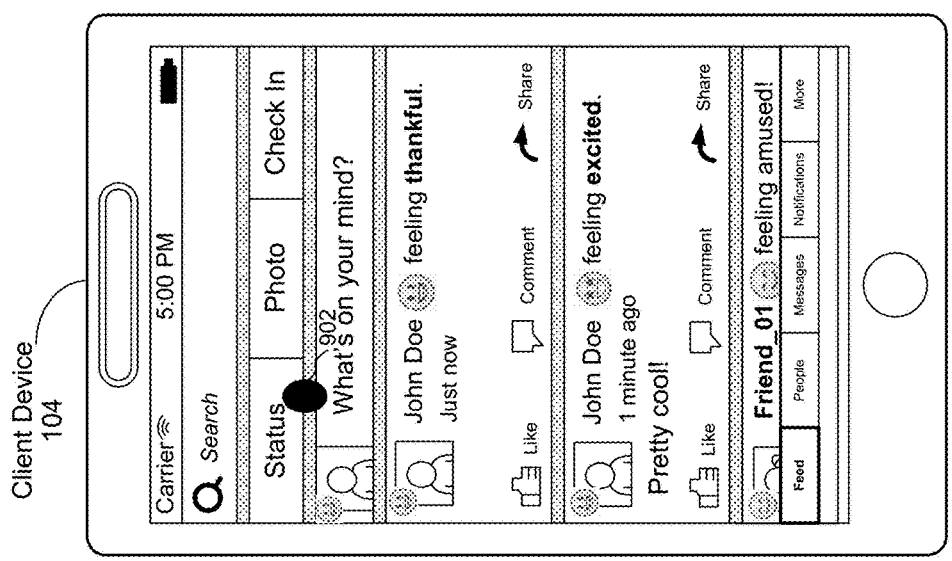
Figure 9D:
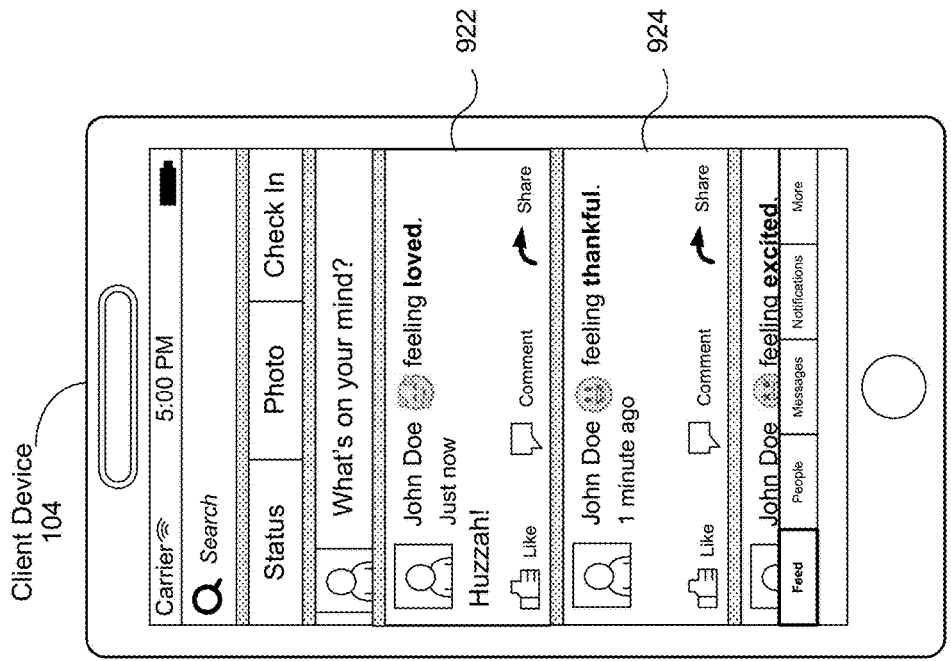
Figure 9C:
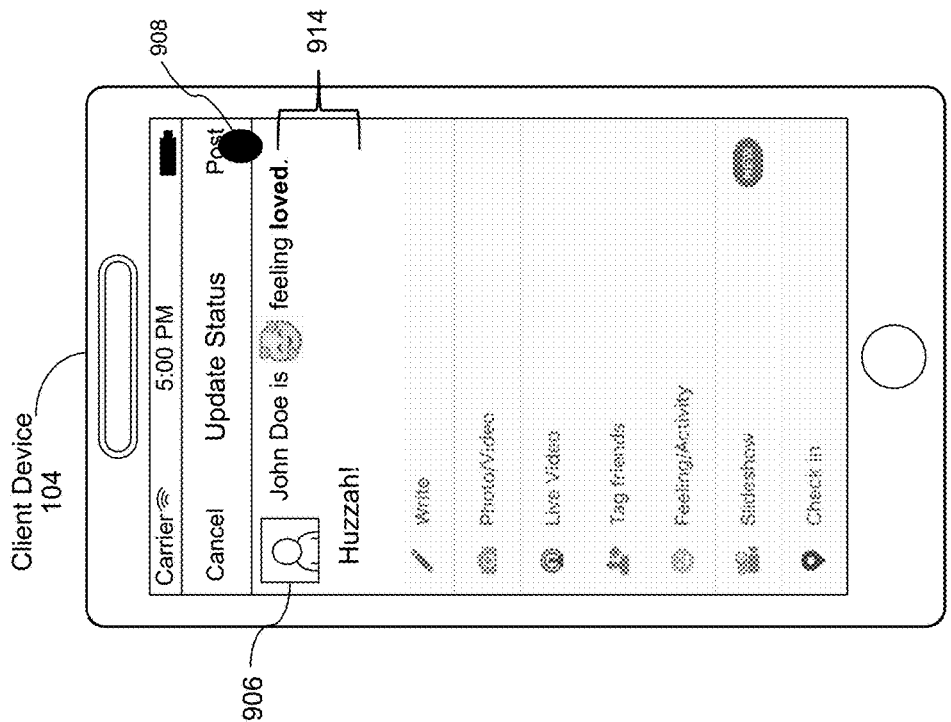

For example, as shown in FIG. 9B, the user selects the icon 901 for "loved" from the plurality of icons, and an image 905 including the icon 901 overlaying the profile picture 903 is displayed. In some embodiments, the visual indicator 907 overlays the image 905, e.g., overlaying the icon 901 in the image 905, to provide the user an option of excluding the icon from overlaying the profile picture. The client device 104 may receive a user interaction 904 with the visual indicator 907 from the user to exclude the image 905, i.e., the icon 901 overlaying the profile picture 903, from the post. In some embodiments, the client device also displays the user's status 910 (e.g., generated without any further user interaction) to read "John Doe is ☺ feeling loved." In some embodiments, the user may further provide content 912, e.g., "Huzzah!" for the post 914. After receiving the user interaction 904 with the visual indicator 907, as shown in FIG. 9C, the image 906 associated with the post 914 is updated to show only the user profile picture without overlaying the icon for "loved."

In response to a user interaction 908 with the button "post," the social networking system posts the current post without the new image, e.g., image 905. In some embodiments, the new image is excluded from all posts, i.e., the current post and the one or more posts of the user to the social networking system that precede and follow the current post. That is, the user device displays only the profile picture of the user without an overlaid icon in the current post and in one or more posts of the user to the social networking system that precede and follow the current post. For example, as shown in FIG. 9D, only the profile picture is displayed to be associated with the user profile, the current post 922, and the earlier post 924.

Figure 9E:
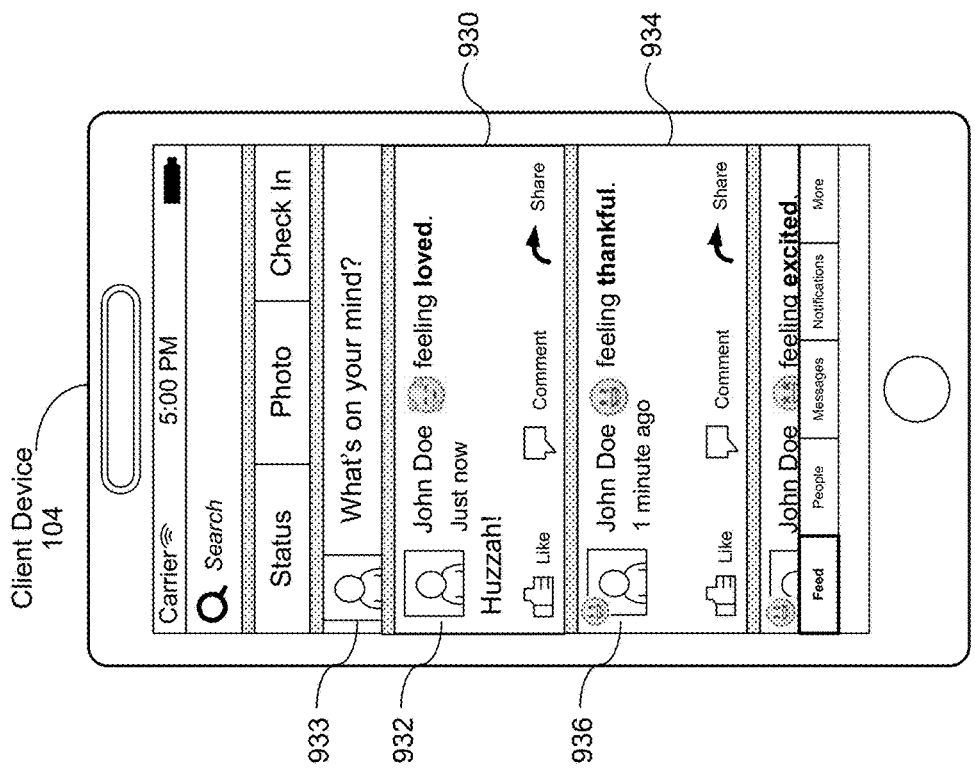

In some embodiments, after posting the current post without an image including an icon overlaying the profile picture, the previous images in one or more posts of the user to the social networking system that precede the current post remain unchanged. The profile picture of the user without an overlaid icon is displayed only in one or more posts of the user to the social networking system that follow the second post. For example as shown in FIG. 9E, after posting the post 930, the image 932 of the post 930 and the image 933 of the user profile only include the user profile picture without having an icon overlaying the user profile picture. An earlier post 934 preceding the post 930 keeps the image 936 which includes the icon for "thankful" overlaying the profile picture.

In some embodiments, the user can interact with the profile picture directly for posting a user's status. For example, the user may touch or click a region nearby the user profile picture 510 in FIG. 5A or the user profile picture 536 in FIG. 5F for creating a post to express the current user's status.

In some embodiments, a privacy setting for showing the image (e.g., an icon overlaying the profile picture) of the user on the social networking system specifies a first set of users who can view the image and a second set of users who cannot view the image but who can view the profile picture of the user without the icon being overlaid.

In some embodiments, in the absence of receiving any user input for changing the image (e.g., including an icon overlaying the profile picture), the image is associated with the user on the social networking system (e.g., including in user posts and user profile) for a predetermined period of time, such as 24 hours, 4 hours, etc. After the predetermined period of time, the image is excluded from the user posts and the user profile on the social networking system. In some embodiments, only the use profile with be updated to exclude the image after the predetermined period of time. The image will be associated with corresponding posts on the social networking system permanently without having the limited time for display.

Figure 10:
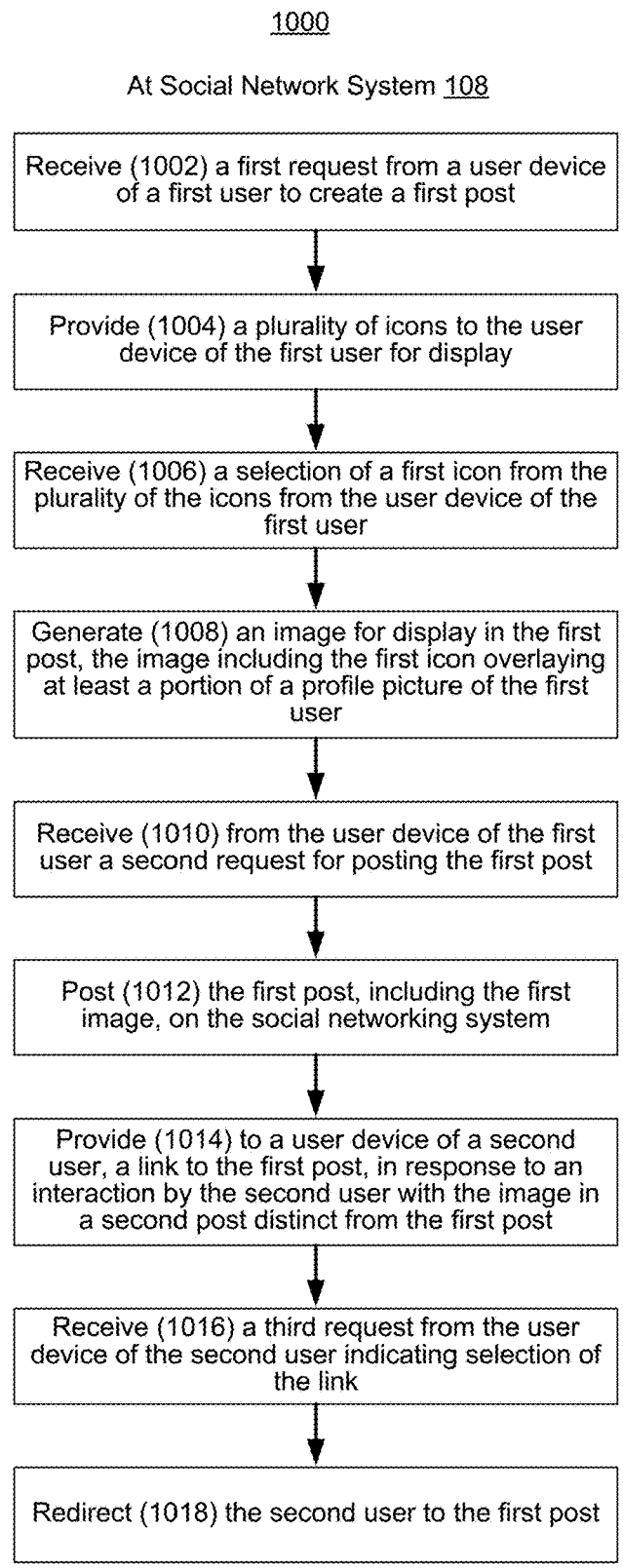
FIG. 10 is a flow diagram illustrating a method of creating an icon overlaying at least a portion of a profile picture of a user on a social networking system, in accordance with some embodiments.

FIG. 10 is a flow diagram illustrating a method 1000 of creating an icon overlaying at least a portion of a profile picture of a user on a social networking system, in accordance with some embodiments. The steps of the method 1000 may be performed by any combination of client device 104 (FIGS. 1, 3, 5A-5F) and/or social network system 108 (FIGS. 1 and 2). FIG. 10 corresponds to instructions stored in computer memory (e.g., memory 306 of the client device 104, FIG. 3; memory 206 of the social network system 108, FIG. 2) or another computer-readable storage medium.

In performing method 1000, the social network system 108 receives (1002) a first request from a user device (e.g., client device 104-1) of a first user to create a first post. For example, the first request is related to creating a post to update a user's status on the social networking system as discussed with reference to FIG. 5A. In response to the first request, the social network system 108 provides (1004) a plurality of icons to the user device for display, such as the plurality of icons shown in FIG. 5C. The social network system 108 further receives (1006) a selection of a first icon (e.g., the icon "excited" in FIG. 5D) from the plurality of icons from the user device of the first user. In response to the user selection, the social network system 108 generates (1008) an image for display in the first post. The image includes the first icon overlaying at least a portion of the profile picture of the first user. In some embodiments, the social network system 108 also generates the user's status using the corresponding template (e.g., the user's status 524 of FIG. 5D.)

In some embodiments, the plurality of icons visually represent respective user states. The selected first icon visually represents a declared state of the user (e.g., "feeling excited" as shown in FIG. 4D.) In some embodiments, the declared state of the user comprises an emotional state or an activity of the user. In some embodiments, in the image, the first icon is smaller than the profile picture of the user and the first icon partially overlays the profile picture of the user (e.g., image 528 of FIG. 5D). In some embodiments, the first icon is offset from a center of the profile picture in the image (e.g., image 528 of FIG. 5D).

In some embodiments, the social network system 108 receives (1010) from the user device of the first user a second request for posting the first post. For example, the user interact with the button "post" as shown in FIG. 5D, and the client device 104-1 sends a request for posting the first post to the social network system 108. In response to the second request, the social network system 108 posts (1012) the first post, which includes the image (e.g., image 528 of FIG. 5D) on the social networking system.

In some embodiments, the social network system 108 receives an interaction by a second user with the image in a second post distinct from the first post. For example, the second user is a contact of the first user and is viewing the second post of the first user on the feed page of the second user. In response to the interaction by the second user with the image in the second post, the social network system 108 provides (1014), to a user device (e.g., client device 104-2) of a second user, a link to the first post. The link is displayed on the user device of the second user, and the second user may touch or click the link. The social network system 108 receives (1016) a third request from the user device of the second user indicating selection of the link. In response to the third request, the social network system 108 redirects (1018) the second user to the first post, such that the second user can promptly view the content and the user's status published by the first post.

For situations in which the systems discussed above collect information about users, the users may be provided with an opportunity to opt in/out of programs or features that may collect personal information (e.g., information about a user's preferences or a user's contributions to social content providers).

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method, comprising:
   at an electronic device having one or more processors and memory storing instructions for execution by the one or more processors:
   receiving, from a user, a first user input for creating a first post on a social networking system;
   in response to the first user input, displaying a plurality of icons for selection by the user;
   receiving, from the user, a selection of a first icon from the plurality of icons; and
   posting the first post to the social networking system, including displaying a profile picture of the user within a first region adjacent to user-provided content of the first post and displaying the first icon overlaid on a portion of the profile picture in the first region;
   receiving, from the user, a second user input for creating a second post;
   determining whether the user has selected a second icon to replace the first icon; and
   in accordance with a determination that the user has not selected a second icon to replace the first icon, posting the second post to the social networking system, including displaying the profile picture of the user within a second region adjacent to user-provided content of the second post and displaying the first icon overlaid on the portion of the profile picture in the second region.

2. The method of claim 1, wherein:
   the plurality of icons visually represents respective user states;

the first icon visually represents a declared state of the user; and the declared state of the user comprises an emotional state or an activity of the user.

3. The method of claim 1, wherein:

the first icon is smaller than the profile picture of the user; and the portion of the profile picture overlaid by the first icon is less than the entire profile picture.

4. The method of claim 1, further comprising, after posting the first post:

receiving a first user interaction with a first image in a post distinct from the first post;

in response to the first user interaction, providing a link to the first post;

receiving a second user interaction selecting the link; and in response to the second user interaction, displaying the first post.

5. The method of claim 1, further comprising:

receiving a first user interaction with the profile picture in the first post;

in response to the first user interaction, providing an affordance to the user for removing the first icon;

receiving a second user interaction selecting the affordance; and in response to the second user interaction, ceasing to overlay the first icon on the portion of the profile picture.

6. The method of claim 1, further comprising:

receiving, from the user, a third user input to create a third post on the social networking system;

receiving, from the user, a fourth user input to exclude the first icon from the third post; and posting the third post without the first icon.

7. The method of claim 6, further comprising excluding the first icon from one or more posts of the user to the social networking system that precede the third post.

8. The method of claim 6, wherein the first post precedes the second post, the second post precedes the third post, and the method further comprises, after posting the third post without the first icon:

for each post that precedes the third post, displaying the profile picture of the user within a respective region of the respective post and displaying the first icon overlaid on the portion of the profile picture in the respective region; and displaying the profile picture of the user without an overlaid icon in one or more posts of the user to the social networking system that follow the third post.

9. The method of claim 1, wherein the first user input comprises a user interaction with the profile picture of the user on the social networking system.

10. The method of claim 1, wherein a privacy setting of the user on the social networking system specifies a first set of users who can view the overlaid first icon and a second set of users who cannot view the overlaid first icon.

11. The method of claim 1, wherein, in the absence of receiving any user input for changing the first icon, the first icon is associated with the user on the social networking system for a predetermined period of time.

12. A method, comprising:

at a server for a social networking system, the server having one or more processors and memory storing instructions for execution by the one or more processors:

receiving a first request from a user device of a first user to create a first post;

providing a plurality of icons to the user device for display;

receiving from the user device a selection of a first icon from the plurality of the icons;

posting the first post, including rendering a profile picture of the user within a first region adjacent to user-provided content of the first post and rendering the first icon overlaid on a portion of the profile picture in the first region;

receiving, from the user, a second request to create a second post;

determining whether the user has selected a second icon to replace the first icon; and in accordance with a determination that the user has not selected a second icon to replace the first icon, posting the second post to the social networking system, including rendering the profile picture of the user within a second region adjacent to user-provided content of the second post and rendering the first icon overlaid on the portion of the profile picture in the second region.

13. The method of claim 12, wherein:

the plurality of icons visually represents respective user states;

the first icon is a visual representation of a declared state of the user; and the declared state of the user comprises an emotional state or an activity of the user.

14. The method of claim 12, further comprising:

providing, to a user device of a second user, a link to the first post, in response to an interaction by the second user with an image in a second post distinct from the first post;

receiving a third request from the user device of the second user indicating selection of the link; and in response to the third request, redirecting the second user to the first post.

15. A non-transitory computer-readable storage medium storing one or more programs for execution by one or more processors of an electronic device, the one or more programs including instructions for:

receiving, from a user, a first user input for creating a first post on a social networking system;

in response to the first user input, displaying a plurality of icons for selection by the user;

receiving, from the user, a selection of a first icon from the plurality of icons;

posting the first post to the social networking system, including displaying a profile picture of the user within a first region of the first post and displaying the first icon overlaid on a portion of the profile picture in the first region;

receiving, from the user, a second user input for creating a second post; and in accordance with a determination that the user has not selected a second icon to replace the first icon, posting the second post to the social networking system, including displaying the profile picture of the user within a second region of the second post and displaying the first icon overlaid on the portion of the profile picture in the second region.

* * * * *